(12) United States Patent
Shiau et al.

(10) Patent No.: US 12,242,744 B2
(45) Date of Patent: Mar. 4, 2025

(54) METHOD OF IDENTIFYING TYPE OF MEMORY CARD

(71) Applicant: REALTEK SEMICONDUCTOR CORPORATION, Hsinchu (TW)

(72) Inventors: Jiunn-Hung Shiau, Hsinchu (TW); Neng-Hsien Lin, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 209 days.

(21) Appl. No.: 17/970,375

(22) Filed: Oct. 20, 2022

(65) Prior Publication Data

US 2023/0176757 A1 Jun. 8, 2023

(30) Foreign Application Priority Data

Dec. 7, 2021 (TW) ................................ 110145632

(51) Int. Cl.
*G06F 3/06* (2006.01)

(52) U.S. Cl.
CPC .......... *G06F 3/0632* (2013.01); *G06F 3/0604* (2013.01); *G06F 3/0679* (2013.01)

(58) Field of Classification Search
CPC .... G06F 3/0632; G06F 3/0604; G06F 3/0679; G06F 3/0653
See application file for complete search history.

(56) References Cited

U.S. PATENT DOCUMENTS

| 10,706,000 | B2 | 7/2020 | Shiau | |
|---|---|---|---|---|
| 2007/0168614 | A1* | 7/2007 | Luo | G06F 13/385 |
| | | | | 711/115 |
| 2013/0024585 | A1* | 1/2013 | Takahashi | G06F 13/4291 |
| | | | | 710/74 |
| 2014/0258563 | A1* | 9/2014 | Otsuka | G06F 13/385 |
| | | | | 710/13 |
| 2016/0188245 | A1* | 6/2016 | Thadi Suryaprakash | |
| | | | | G06F 1/3296 |
| | | | | 710/13 |

(Continued)

FOREIGN PATENT DOCUMENTS

| CN | 100585611 C | 1/2010 |
|---|---|---|
| CN | 104008079 B | 4/2017 |

(Continued)

OTHER PUBLICATIONS

3) OA letter of a counterpart TW application (appl. No. 110145632) mailed on Jun. 2, 2022. 4) Summary of the TW OA letter in regard to the TW counterpart application: 1) Claim(s) 1 is/are rejected under Patent Law Article 22(2) as being unpatentable over reference 1 (CN 213069787U) and reference 2 (TW 201933687A). (2) Claim(s) T is/are rejected under Patent Law Article 22(1) as being anticipated by reference 1 (CN 213069787U).

*Primary Examiner* — Farley Abad
(74) *Attorney, Agent, or Firm* — WPAT, PC

(57) ABSTRACT

A method of identifying the type of a memory card is provided for identifying the type of a secure digital (SD) card. The pin number of the SD card complies with an SD card specification formulated by the Secure Digital Association. The method includes the following steps: performing a legacy SD card initialization procedure on the SD card; and sequentially determining whether the SD card is an SD Express card, an Ultra High Speed type II (UHS-II) SD card, or a legacy SD card.

20 Claims, 28 Drawing Sheets

(56) References Cited

U.S. PATENT DOCUMENTS

| | | | |
|---|---|---|---|
| 2017/0192919 A1* | 7/2017 | Ono | G06F 13/4282 |
| 2019/0182954 A1* | 6/2019 | Sirajudeen | G06F 13/4282 |
| 2020/0034317 A1* | 1/2020 | Kato | G06F 13/1668 |
| 2020/0233595 A1* | 7/2020 | Hsieh | G06F 13/4081 |
| 2020/0233818 A1* | 7/2020 | Hsieh | G06F 13/1668 |
| 2020/0285598 A1* | 9/2020 | Shiau | G06F 13/409 |
| 2022/0269629 A1* | 8/2022 | Pinto | G06F 13/387 |
| 2023/0221887 A1* | 7/2023 | Fujimoto | G06F 13/4282 |
| | | | 711/154 |

FOREIGN PATENT DOCUMENTS

| | | | |
|---|---|---|---|
| CN | 213069787 U | 4/2021 | |
| TW | I638266 | 10/2018 | |
| TW | 201933687 A | 8/2019 | |
| WO | WO-2016009692 A1 * | 1/2016 | G06F 1/266 |

\* cited by examiner

| pin # | SD | UHS-II | PCIe |
|---|---|---|---|
| 1 | CD/DAT3 | - | PERST# |
| 2 | CMD | - | |
| 3 | VSS1 | VSS1 | VSS1 |
| 4 | VDD | VDD1 | VDD1 |
| 5 | CLK | - | |
| 6 | VSS2 | VSS2 | VSS2 |
| 7 | DAT0 | RCLK+ | REFCLK+ |
| 8 | DAT1 | RCLK- | REFCLK- |
| 9 | DAT2 | - | CLKREQ# |

| pin # | SD | UHS-II | PCIe |
|---|---|---|---|
| 10 | - | VSS3 | VSS3 |
| 11 | - | D0+ | PCIe_Tx+ |
| 12 | - | D0- | PCIe_Tx- |
| 13 | - | VSS4 | VSS4 |
| 14 | - | VDD2 | VDD2 |
| 15 | - | D1- | PCIe_Rx- |
| 16 | - | D1+ | PCIe_Rx+ |
| 17 | - | VSS5 | VSS5 |
| 18 | | | VDD3 |

METHOD OF IDENTIFYING TYPE OF MEMORY CARD

BACKGROUND OF THE INVENTION

1. Field of the Invention

The present invention generally relates to Secure Digital memory cards (SD cards), and, more particularly, to a card reading device of SD cards, an electronic device, and a method of determining the types of SD cards.

2. Description of Related Art

At present, there are three prevailing types of SD cards: legacy SD cards, SD cards that support the Peripheral Component Interconnect Express (PCIe) interface (hereinafter referred to as the PCIe interface and the SD Express cards), and SD cards that support the Ultra High Speed type II (UHS-II) interface (hereinafter referred to as the UHS-II interface and the UHS-II SD cards). The SD Express cards and UHS-II SD cards are backward compatible with the legacy SD cards. However, the SD Express cards and the UHS-II SD cards are the same in terms of the arrangement of the signal contacts, but the PCIe interface is an alternating current (AC) coupled interface while the UHS-II interface is a direct current (DC) coupled interface, making it difficult for the card readers to support the SD Express cards and the UHS-II SD card at the same time, which is not convenient for the users. Moreover, if a card reader is backward compatible with the legacy SD cards, then identifying the types of the SD cards is a great challenge.

Therefore, there is a need for a method of identifying the types of SD cards.

SUMMARY OF THE INVENTION

In view of the issues of the prior art, an object of the present invention is to provide methods of identifying the types of the SD cards, so as to make an improvement to the prior art.

According to one aspect of the present invention, a method of identifying a type of an SD card whose pin numbers comply with an SD card specification formulated by the Secure Digital Association is provided. The method includes the following steps: performing one of an Ultra High Speed type II (UHS-II) SD card initialization procedure and an SD Express card initialization procedure on the SD card; controlling pin #4 of the SD card to be substantially zero volts; controlling pin #14 of the SD card to be substantially zero volts; performing another of the UHS-II SD card initialization procedure and the SD Express card initialization procedure on the SD card; and determining whether the SD card is a UHS-II SD card or an SD Express card.

According to another aspect of the present invention, a method of identifying a type of an SD card whose pin numbers comply with an SD card specification formulated by the Secure Digital Association. The method includes the following steps: performing a legacy SD card initialization procedure on the SD card; and determining in sequence whether the SD card is an SD Express card, an Ultra High Speed type II (UHS-II) SD card, or a legacy SD card.

According to still another aspect of the present invention, a method of identifying a type of an SD card whose pin numbers comply with an SD card specification formulated by the Secure Digital Association. The method includes the following steps: performing an Ultra High Speed type II (UHS-II) SD card initialization procedure on the SD card; determining whether the SD card is a UHS-II SD card; controlling pin #4 of the SD card to be substantially zero volts, controlling pin #14 of the SD card to be substantially zero volts, and performing a legacy SD card initialization procedure on the SD card when the SD card is not the UHS-II SD card; determining whether the SD card is an SD Express card; and determining whether the SD card is a legacy SD card when the SD card is not the SD Express card.

According to the present invention, the method of identifying the types of the memory cards can identify at least the SD Express cards, the UHS-II SD cards, and the legacy SD cards.

These and other objectives of the present invention no doubt become obvious to those of ordinary skill in the art after reading the following detailed description of the preferred embodiments with reference to the various figures and drawings.

BRIEF DESCRIPTION OF THE DRAWINGS

FIG. 13 shows the pin numbers of the SD cards.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes card reading devices or electronic devices that support multiple types of SD cards and methods of identifying the types of SD cards. On account of that some or all elements of the card reading devices and electronic devices could be known, the detail of such elements is omitted provided that such detail has little to do with the features of this disclosure, and that this omission nowhere dissatisfies the specification and enablement requirements. Some or all of the processes of the methods of identifying the types of SD cards may be implemented by software and/or firmware, and can be performed by the card reading devices or their equivalents. A person having ordinary skill in the art can choose components or steps equivalent to those described in this specification to carry out the present invention, which means that the scope of this invention is not limited to the embodiments in the specification.

Figure 1:
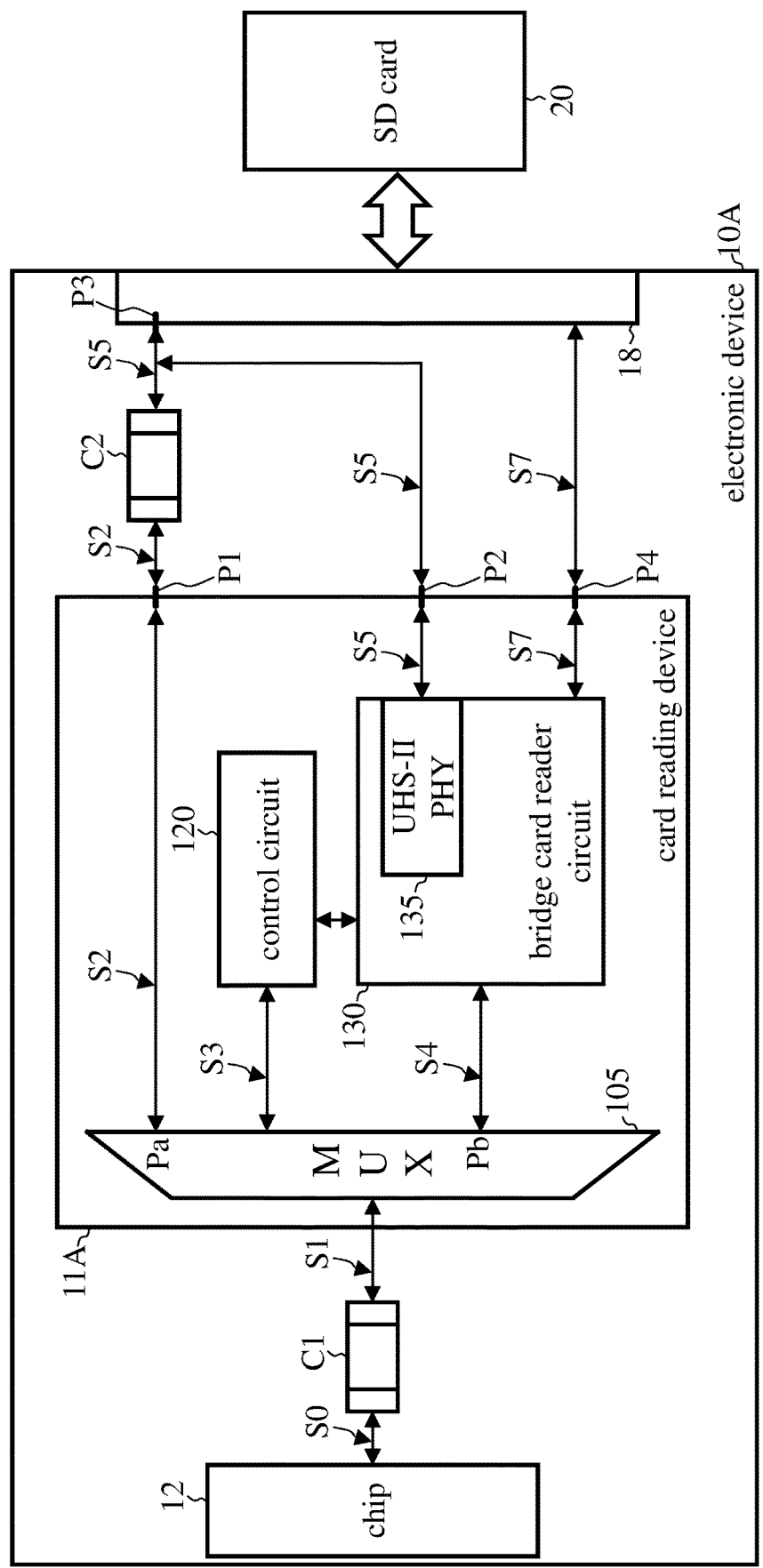
FIGS. 1-12 are functional block diagrams of an electronic device according to various embodiments of the present invention.

FIG. 1 is a functional block diagram of an electronic device according to an embodiment of the present invention. The electronic device 10A has a card reading function and can access the SD card 20. The electronic device 10A includes a chip 12, a capacitor C1, a card reading device 11A, a capacitor C2, and a memory card slot 18. The card reading device 11A is coupled between the chip 12 and the memory card slot 18. More specifically, the card reading device 11A is coupled to the chip 12 through the capacitor C1 and coupled to the memory card slot 18 through the capacitor C2. The memory card slot 18 is used to receive the SD card 20 (i.e., the SD card 20 can be inserted into the memory card slot 18).

One end of the capacitor C1 is coupled or electrically connected to the chip 12, while the other end is coupled or electrically connected to the card reading device 11A. The capacitor C1 functions as an AC coupling capacitor. When being transmitted in a direction from the chip 12 to the card reading device 11A, the signal S0 between the chip 12 and the capacitor C1 contains both AC and DC components, whereas the signal S1 between the capacitor C1 and the card reading device 11A contains only the AC component but no DC component; when being transmitted in a direction from the card reading device 11A to the chip 12, the signal S1 contains the AC component and the DC component, whereas the signal S0 contains only the AC component but no DC component. Since the PCIe signal is a signal transmitted by AC coupling, one purpose of the capacitor C1 is to provide a PCIe signal connection between the chip 12 and the card reading device 11A, that is, to establish the PCIe interface between the chip 12 and the card reading device 11A.

One end of the capacitor C2 is coupled or electrically connected to the pin P1 of the card reading device 11A, while the other end of the capacitor C2 is coupled or electrically connected to the pin P3 of the memory card slot 18. The capacitor C2 functions as an AC coupling capacitor. When being transmitted in a direction from the memory card slot 18 to the card reading device 11A, the signal S5 between the pin P3 and the capacitor C2 contains AC and DC components, whereas the signal S2 between the capacitor C2 and the pin P1 contains only the AC component but no DC component; when being transmitted in a direction from the card reading device 11A to the memory card slot 18, the signal S2 may contain an AC component and a DC component, whereas the signal S5 contains only the AC component but no DC component. Note that when the signal transmitted between the pin P1 and the pin P3 is a PCIe signal, the signal S5 and the signal S2 are both PCIe signals.

The card reading device 11A further includes a pin P2 and a pin P4. The pin P2 is coupled or electrically connected to the pin P3, and the pin P4 is coupled or electrically connected to at least one pin (not shown) of the memory card slot 18. When the SD card 20 is a legacy SD card, the card reading device 11A accesses the SD card 20 through at least the pin P4 (the signal S7 is a signal complying with the legacy SD card specification and hereinafter referred to as the legacy SD card signal). When the SD card 20 is a UHS-II SD card (in this instance, the signal S5 is a signal complying with the UHS-II SD card specification, hereinafter referred to as the UHS-II SD card signal), the card reading device 11A accesses the SD card 20 through at least the pin P2 but does not access the SD card 20 through the pin P1; When the SD card 20 is an SD Express card (in this instance, the signal S5 is an SD Express card signal), the card reading device 11A accesses the SD card 20 through at least the pin P1 but does not access the SD card 20 through the pin P2.

In some embodiments, the chip 12, the capacitor C1, the capacitors C2, the card reading device 11A, and the memory card slot 18 are disposed on the circuit board (not shown) of the electronic device 10A, and the above-mentioned signal S0, signal S1, signal S2, the signal S5, and the signal S7 are transmitted through the traces on the circuit board or wires.

The card reading device 11A includes a selection circuit 105 (e.g., a multiplexer (MUX)), a control circuit 120, and a bridge card reader circuit 130. The control circuit 120 is coupled to the selection circuit 105 and the bridge card reader circuit 130 and configured to control the selection circuit 105 and the bridge card reader circuit 130.

The bridge card reader circuit 130 can convert the legacy SD card signal (i.e., the signal S7) into the PCIe signal (i.e., the signal S4). The bridge card reader circuit 130 includes the UHS-II physical layer (PHY) 135 which converts the UHS-II SD card signal (e.g., the signal S5) into the signal S4. In other words, the bridge card reader circuit 130 is the bridge card reader circuit for both the legacy SD card and the UHS-II SD card, which is well known to people having ordinary skill in the art, and the details of which are omitted for brevity. For the legacy SD card, please refer to the Physical Layer Simplified Specification on the website of the SD Association: www.sdcard.org/downloads/pls/; for the UHS-II, please refer to UHS-II Simplified Addendum.

The selection circuit 105 receives the signal S2 and the signal S4. The control circuit 120 controls the selection circuit 105 through the control signal S3. When the SD card 20 is an SD Express card, the control circuit 120 controls the selection circuit 105 to select the endpoint Pa; as a result, a path (i.e., a signal connection) is established between the capacitor C1 and the pin P1 (so that the signal S1 is identical to the signal S2), and the capacitor C1 and the bridge card reader circuit 130 are disconnected (i.e., no signal connection therebetween: the signal S1 being not identical to the signal S4). When the SD card 20 is a UHS-II SD card or a legacy SD card, the control circuit 120 controls the selection circuit 105 to select the endpoint Pb; as a result, a path is established between the capacitor C1 and the bridge card reader circuit 130 (so that the signal S1 is identical to the signal S4), and the capacitor C1 and the pin P1 are disconnected (so that the signal S1 is not identical to the signal S2).

When the SD card 20 is an SD Express card, the chip 12 accesses the SD card 20 through the following path:

S0↔C1↔S1↔S2↔C2↔S5; when the SD card 20 is a UHS-II SD card, the chip 12 accesses the SD card 20 through the following path: S0↔C1↔S1↔S4↔130↔S5; when the SD card 20 is a legacy SD card, the chip 12 accesses the SD card 20 through the following path: S0↔C1↔S1↔S4↔130↔S7. In other words, the card reading device 11A supports accesses to various types of SD cards, and the electronic device 10A employing the card reading device 11A is capable of accessing various types of SD cards.

The chip 12 in FIG. 1 is connected or in signal connection with the card reading device 11A through the PCIe interface; in other words, the setting of the capacitor C1 enables the signal transmission between the chip 12 and the card reading device 11A to comply with the PCIe standard. Therefore, in some embodiments, the capacitor C2 may be omitted to reduce cost or circuit area.

Figure 2:
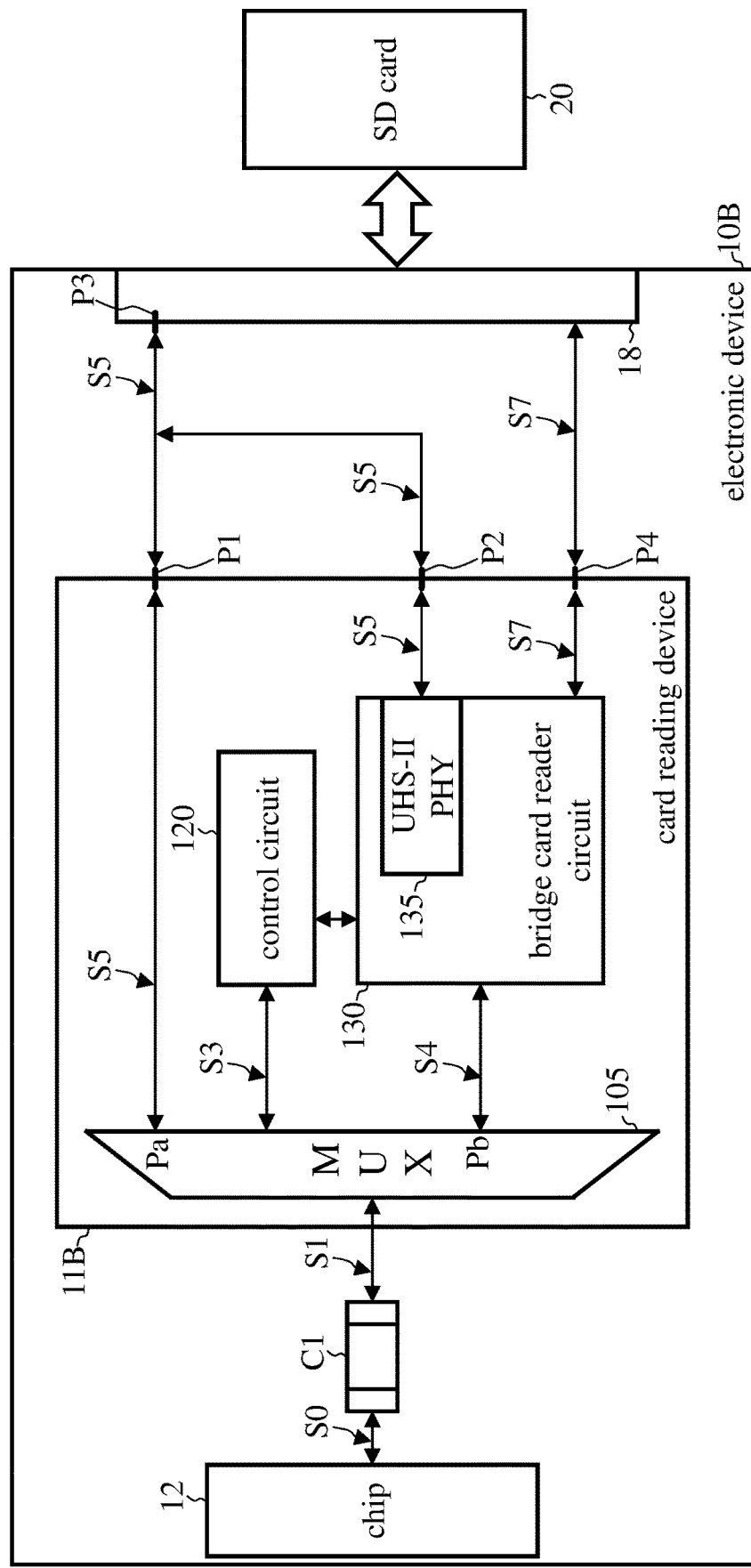

FIG. 2 is a functional block diagram of the electronic device according to another embodiment of the present invention. The electronic device 10B includes a chip 12, a capacitor C1, a card reading device 11B, and a memory card slot 18. The card reading device 11B is the same as the card reading device 11A in FIG. 1. The electronic device 10B is similar to the electronic device 10A, except that the electronic device 10B does not include the capacitor C2. In the embodiment of FIG. 2, the AC coupling of the signal is carried out by the capacitor C1. The embodiment of FIG. 2 is lower in cost and circuit board area compared to the embodiment of FIG. 1 as a result of the omission of the capacitor C2.

Figure 3:
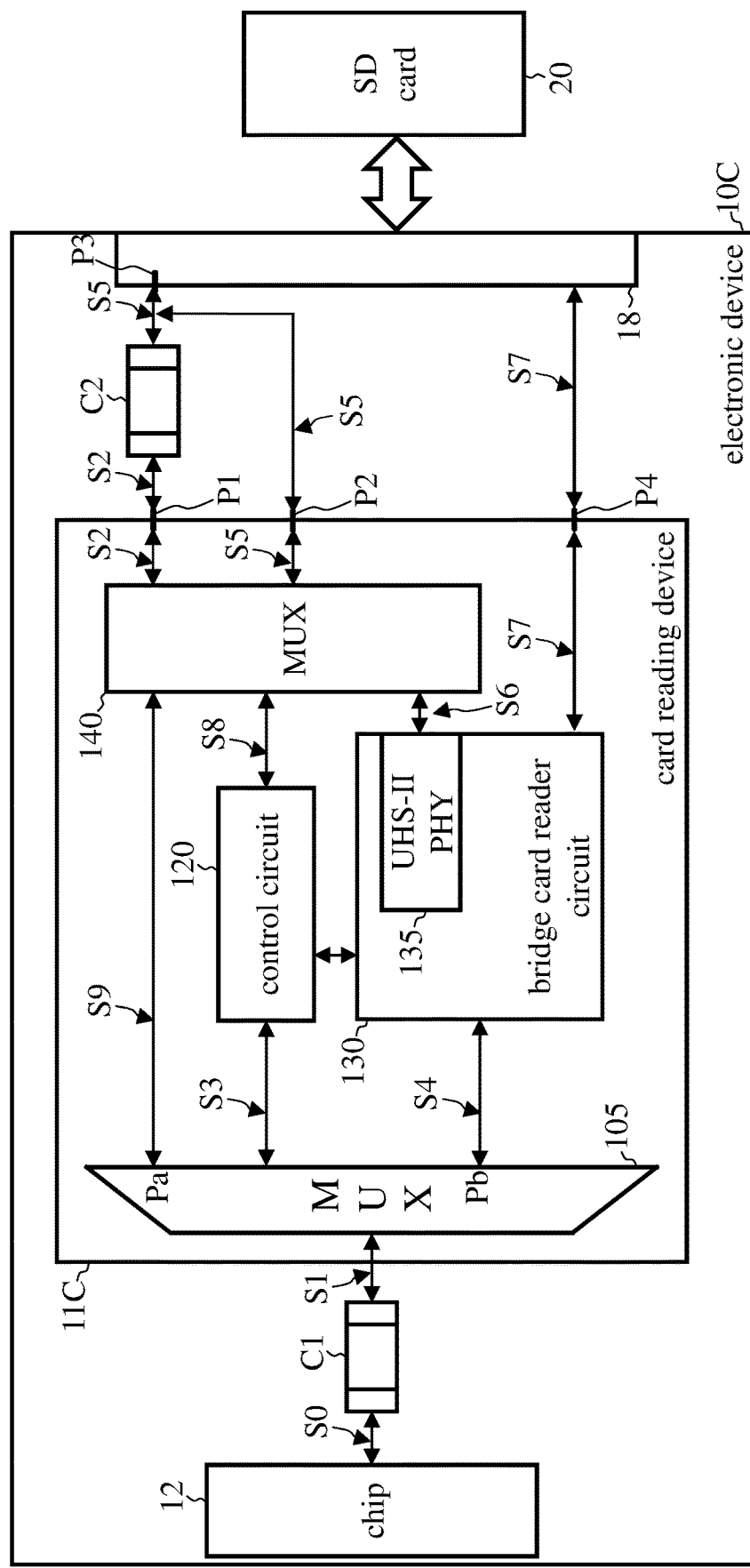

FIG. 3 is a functional block diagram of the electronic device according to another embodiment of the present invention. The electronic device 10C includes a chip 12, a capacitor C1, a card reading device 11C, a capacitor C2, and a memory card slot 18. The card reading device 11C is similar to the card reading device 11A, but the card reading device 11C further includes a selection circuit 140. The selection circuit 140 is coupled or electrically connected to the control circuit 120, the pin P1, the pin P2, the selection circuit 105, and the bridge card reader circuit 130.

The control circuit 120 controls the selection circuit 140 through the control signal S8 according to the type of the SD card 20. More specifically, when the SD card 20 is an SD Express card, the control circuit 120 controls the selection circuit 140 to establish a path between the selection circuit 105 and the pin P1 (so that the signal S9 and the signal S2 are identical) and disconnect the bridge card reader circuit 130 and the pin P2 (so that the bridge card reader circuit 130 and the pin P2 are not in a signal connection or electrically connected); when the SD card 20 is a UHS-II SD card, the control circuit 120 controls the selection circuit 140 to disconnect the selection circuit 105 and the pin P1 and to establish a path between the bridge card reader circuit 130 and the pin P2 (so that the signal S6 and the signal S5 are identical, that is, the bridge card reader circuit 130 is in a signal connection or electrically connected with the pin P2). In some embodiments, the selection circuit 140 can be a multiplexer.

When the bridge card reader circuit 130 and the pin P2 are disconnected, most of the signal S5 is transmitted to the pin P1 through the capacitor C2, which contributes to the improvement to the quality of the signal S2 (e.g., as a result of a reduction in signal attenuation or interference). That is, compared with the embodiment of FIG. 1, the embodiment of FIG. 3 can improve the quality of the PCIe signals (i.e., the signal S2 and the signal S9) of the SD Express card.

Figure 4:
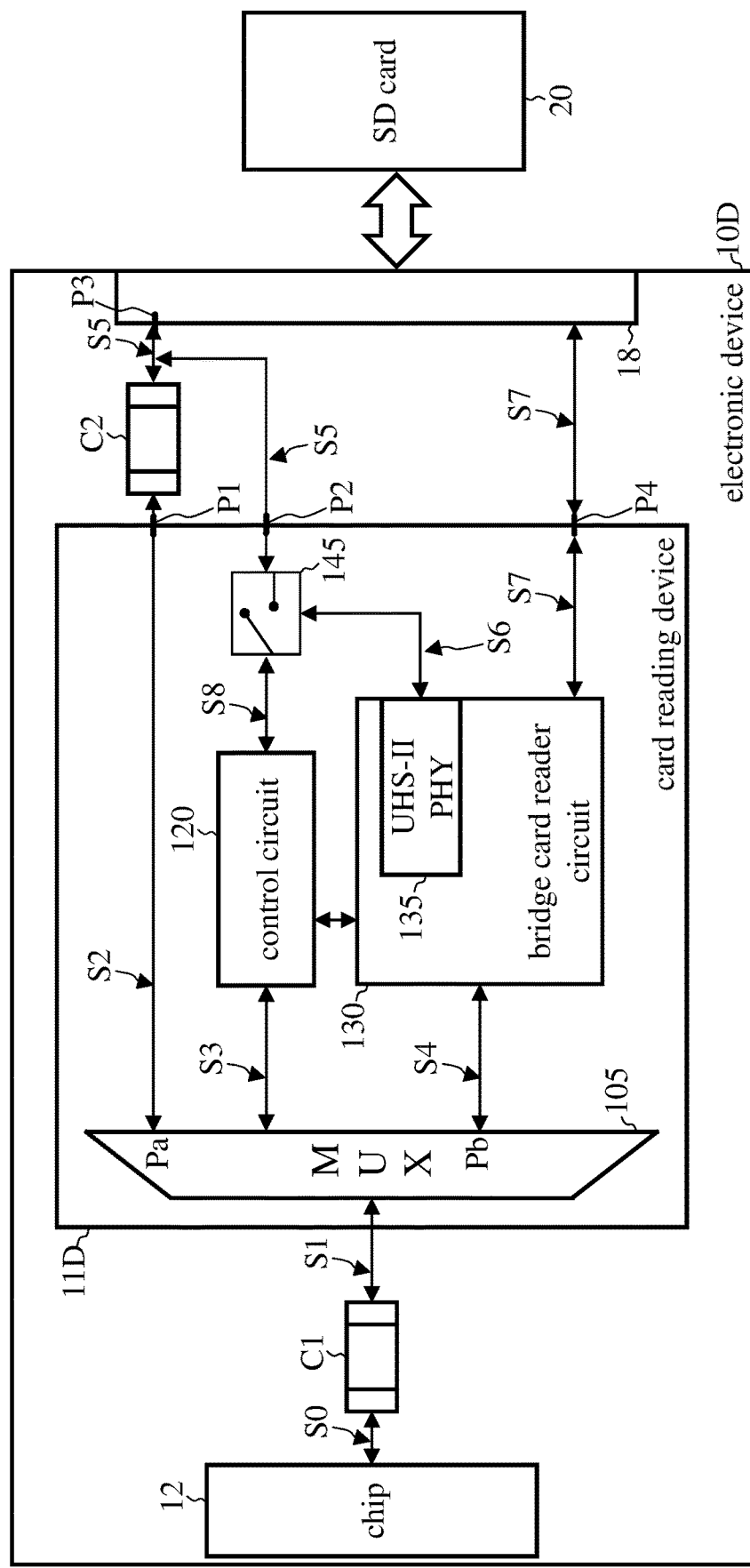

FIG. 4 is a functional block diagram of the electronic device according to another embodiment of the present invention. The electronic device 10D includes a chip 12, a capacitor C1, a card reading device 11D, a capacitor C2, and a memory card slot 18. The card reading device 11D is similar to the card reading device 11A, but the card reading device 11D further includes a switch circuit 145. The switch circuit 145 is coupled or electrically connected to the control circuit 120, the pin P2, and the bridge card reader circuit 130.

The control circuit 120 controls the switch circuit 145 through the control signal S8 according to the type of the SD card 20. More specifically, when the SD card 20 is an SD Express card, the control circuit 120 controls the switch circuit 145 to disconnect the bridge card reader circuit 130 and the pin P2; when the SD card 20 is a UHS-II SD card, the control circuit 120 controls the switch circuit 145 to connect the bridge card reader circuit 130 with the pin P2 (so that the signal S6 and the signal S5 are identical).

Similarly, when the bridge card reader circuit 130 and the pin P2 are disconnected, the quality of the PCIe signal (i.e., the signal S2) of the SD Express card can be improved.

Figure 5:
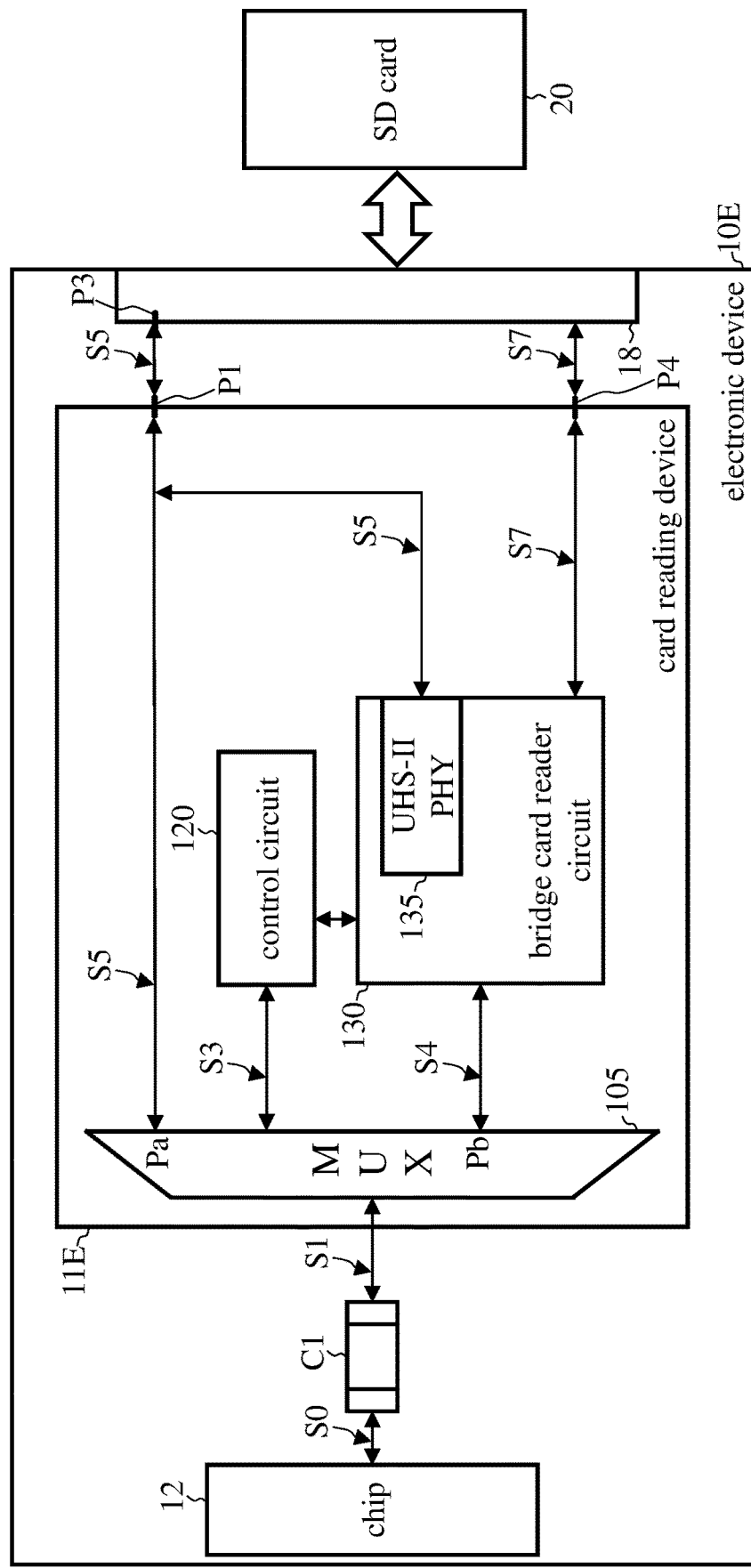

FIG. 5 is a functional block diagram of the electronic device according to another embodiment of the present invention. The electronic device 10E includes a chip 12, a capacitor C1, a card reading device 11E, and a memory card slot 18. The card reading device 11E is similar to the card reading device 11B, but the card reading device 11E does not include the pin P2; as a result, the bridge card reader circuit 130 receives the signal S5 through the pin P1 instead of the pin P2. In comparison with the embodiment of FIG. 2, the card reading device 11E is smaller in area and lower in cost as a result of having fewer pins. In addition, saving pin(s) can also reduce the traces on the circuit board, which in turn reduces the area and cost of the circuit board.

Furthermore, due to its high frequency (about gigahertz (GHz)), the signal S5 is quite sensitive to the branches on the traces. (In PCB design, the branches on the traces is stub.) The impact of the branches on the original signal can only be reduced by controlling the branch length to be less than ⅛ wavelength of the signal (i.e., by means of adjusting the length matching of the transmission line), which can be better achieved by changing the traces inside the chip. For example, the trace length (the distance between the pin P1 and the bridge card reader circuit 130) corresponding to an 8 GHz PCIe signal should be less than ⅛ the wavelength (about 4 mm); for such a short length at this level, it is easier to adjust the trace length within the chip (i.e., within the card reading device 11E) than on the circuit board.

Figure 6:
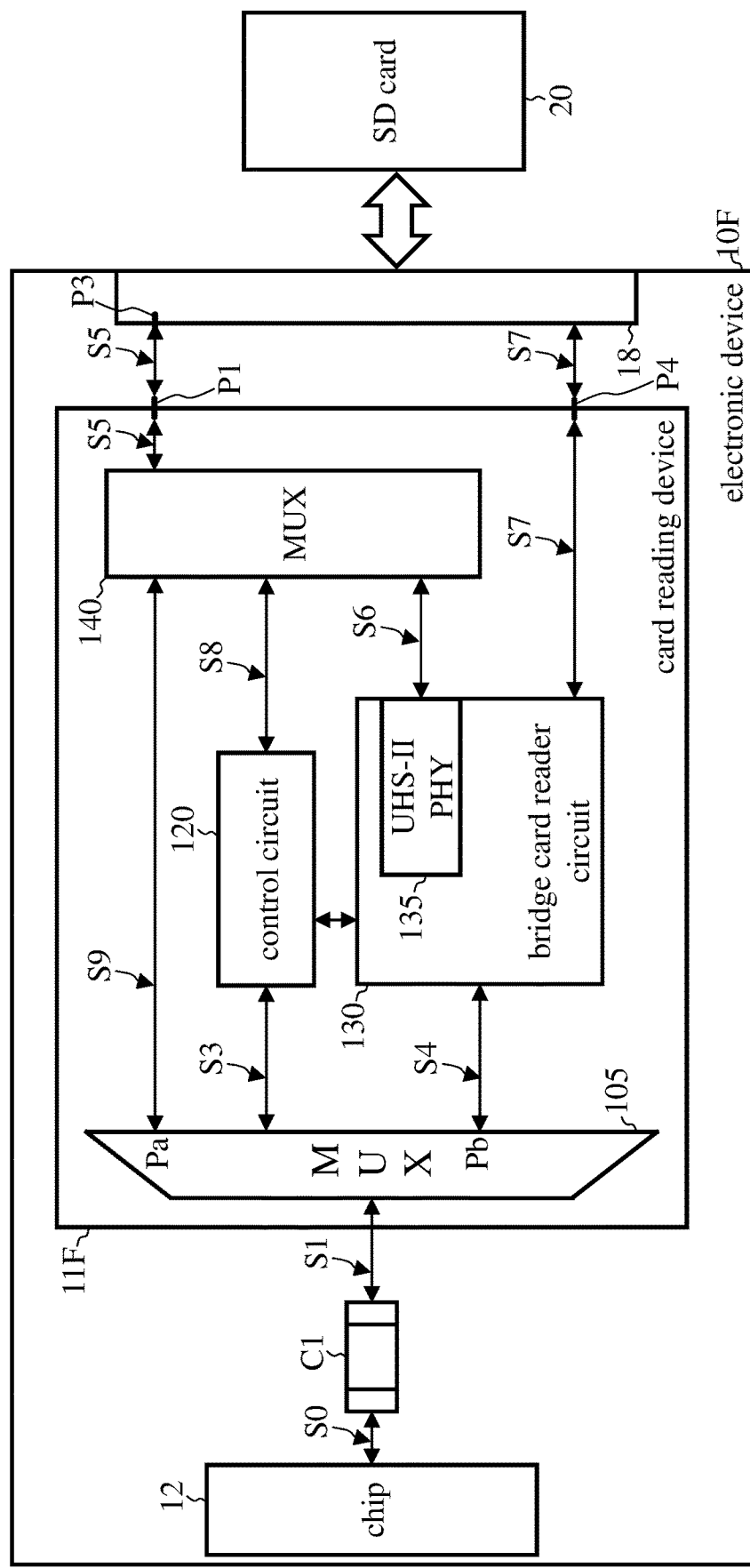

FIG. 6 is a functional block diagram of the electronic device according to another embodiment of the present invention. The electronic device 10F includes a chip 12, a capacitor C1, a card reading device 11F, and a memory card slot 18. The card reading device 11F is similar to the card reading device 11E, but the card reading device 11F further includes a selection circuit 140. The selection circuit 140 is coupled or electrically connected to the control circuit 120, the pin P1, the selection circuit 105, and the bridge card reader circuit 130.

The control circuit 120 controls the selection circuit 140 through the control signal S8 according to the type of the SD card 20. More specifically, when the SD card 20 is an SD Express card, the control circuit 120 controls the selection circuit 140 to establish a path between the selection circuit 105 and the pin P1 (so that the signal S9 and the signal S5 are identical) and to disconnect the bridge card reader circuit 130 and the pin P1; when the SD card 20 is a UHS-II SD card, the control circuit 120 controls the selection circuit 140 to disconnect the selection circuit 105 and the pin P1 and to establish a path between the bridge card reader circuit 130 and the pin P1 (so that the signal S6 and the signal S5 are identical).

When the bridge card reader circuit 130 and the pin P1 are disconnected, the impedance between the bridge card reader circuit 130 and the pin P1 increases; as a result, most of the signal S5 is transmitted to the selection circuit 105 through the selection circuit 140 (i.e., the signal S9 is identical to the signal S5), which contributes to the improvement in the quality of the signal S9. That is, compared with the embodiment of FIG. 5, the embodiment of FIG. 6 can improve the quality of the PCIe signals (i.e., the signal S5 and the signal S9) of the SD Express card.

Figure 7:
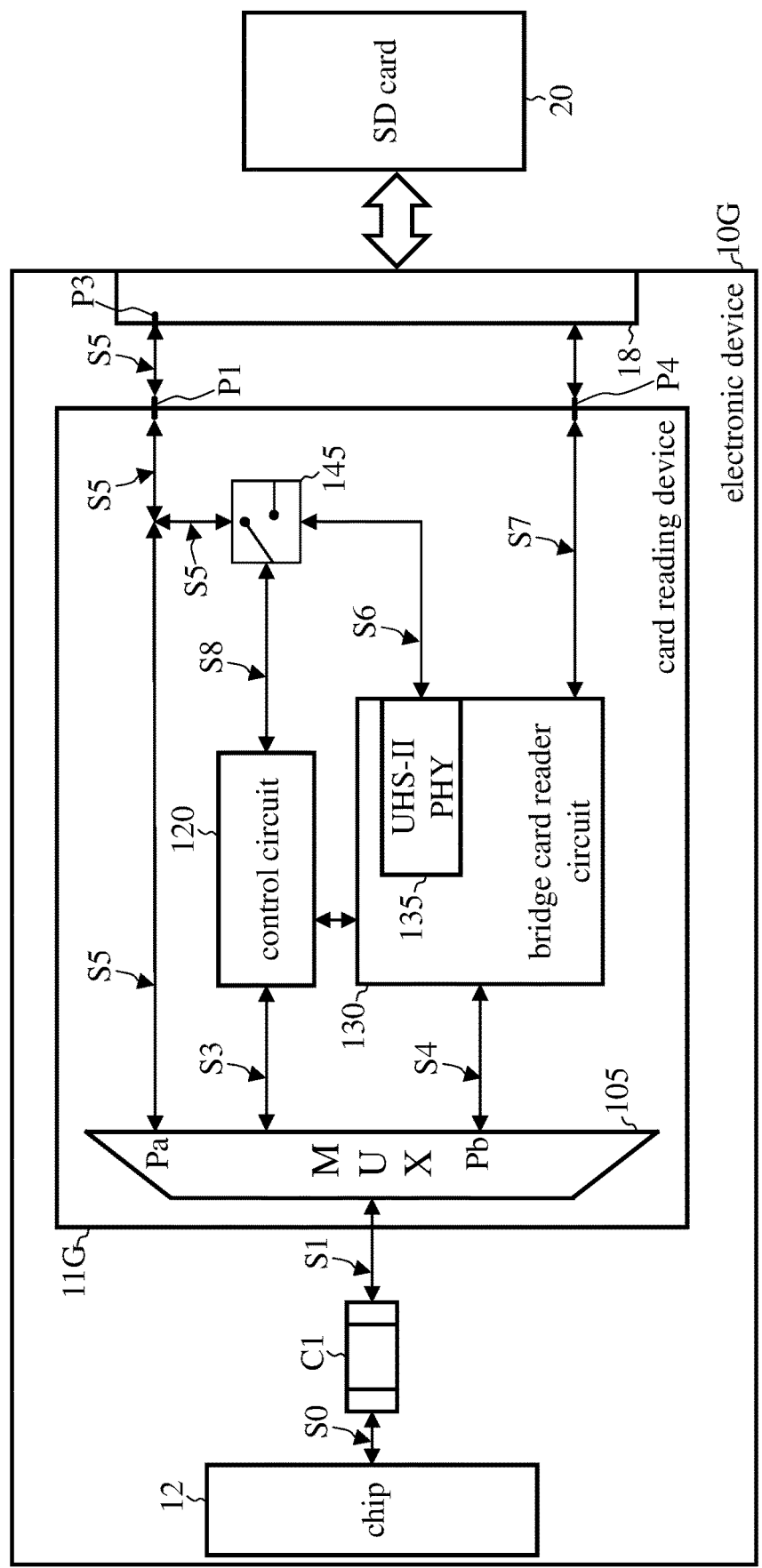

FIG. 7 is a functional block diagram of the electronic device according to another embodiment of the present invention. The electronic device 10G includes a chip 12, a capacitor C1, a card reading device 11G, and a memory card slot 18. The card reading device 11G is similar to the card reading device 11E, but the card reading device 11G further includes a switch circuit 145. The switch circuit 145 is coupled or electrically connected to the control circuit 120, the pin P1, the selection circuit 105, and the bridge card reader circuit 130.

The control circuit 120 controls the switch circuit 145 through the control signal S8 according to the type of the SD card 20. More specifically, when the SD card 20 is an SD Express card, the control circuit 120 controls the switch circuit 145 to disconnect the bridge card reader circuit 130 and the pin P1; when the SD card 20 is a UHS-II SD card, the control circuit 120 controls the switch circuit 145 to establish a path between the bridge card reader circuit 130 and the pin P1 (so that the signal S6 and the signal S5 are identical).

Similarly, when the bridge card reader circuit 130 and the pin P1 are disconnected, the quality of the PCIe signal (i.e., the signal S5) of the SD Express card can be improved.

Figure 8:
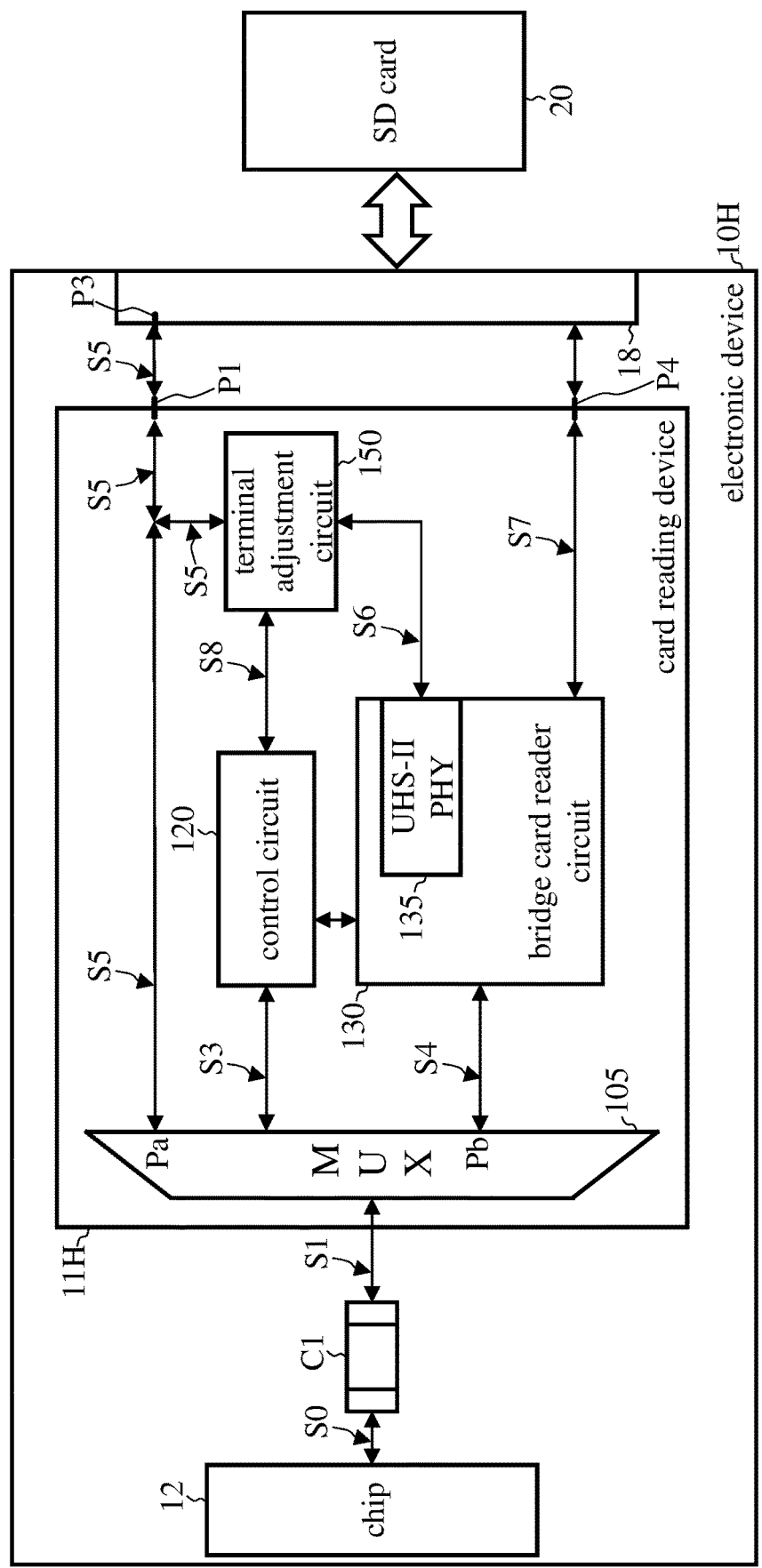

FIG. 8 is a functional block diagram of the electronic device according to another embodiment of the present invention. The electronic device 10H includes a chip 12, a capacitor C1, a card reading device 11H, and a memory card slot 18. The card reading device 11H is similar to the card reading device 11E, but the card reading device 11H further includes a terminal adjustment circuit 150. The terminal adjustment circuit 150 is coupled or electrically connected to the control circuit 120, the pin P1, the selection circuit 105, and the bridge card reader circuit 130.

The control circuit 120 controls the terminal adjustment circuit 150 through the control signal S8 according to the type of the SD card 20. More specifically, when the SD card 20 is an SD Express card, the control circuit 120 controls the terminal adjustment circuit 150 to have a first impedance (e.g., a relatively high impedance that leads to a reduction in the interference of the trace stub with the PCIe signal (i.e., the signal S5), the trace stub being connected to the bridge card reader circuit 130); when the SD card 20 is a UHS-II SD card, the control circuit 120 controls the terminal adjustment circuit 150 to have a second impedance (e.g., a relatively low impedance that leads to the establishment of a path between the bridge card reader circuit 130 and the pin P1 so that the signal S6 is identical to the signal S5). In some embodiments, the first impedance is greater than the second impedance.

Figure 9:
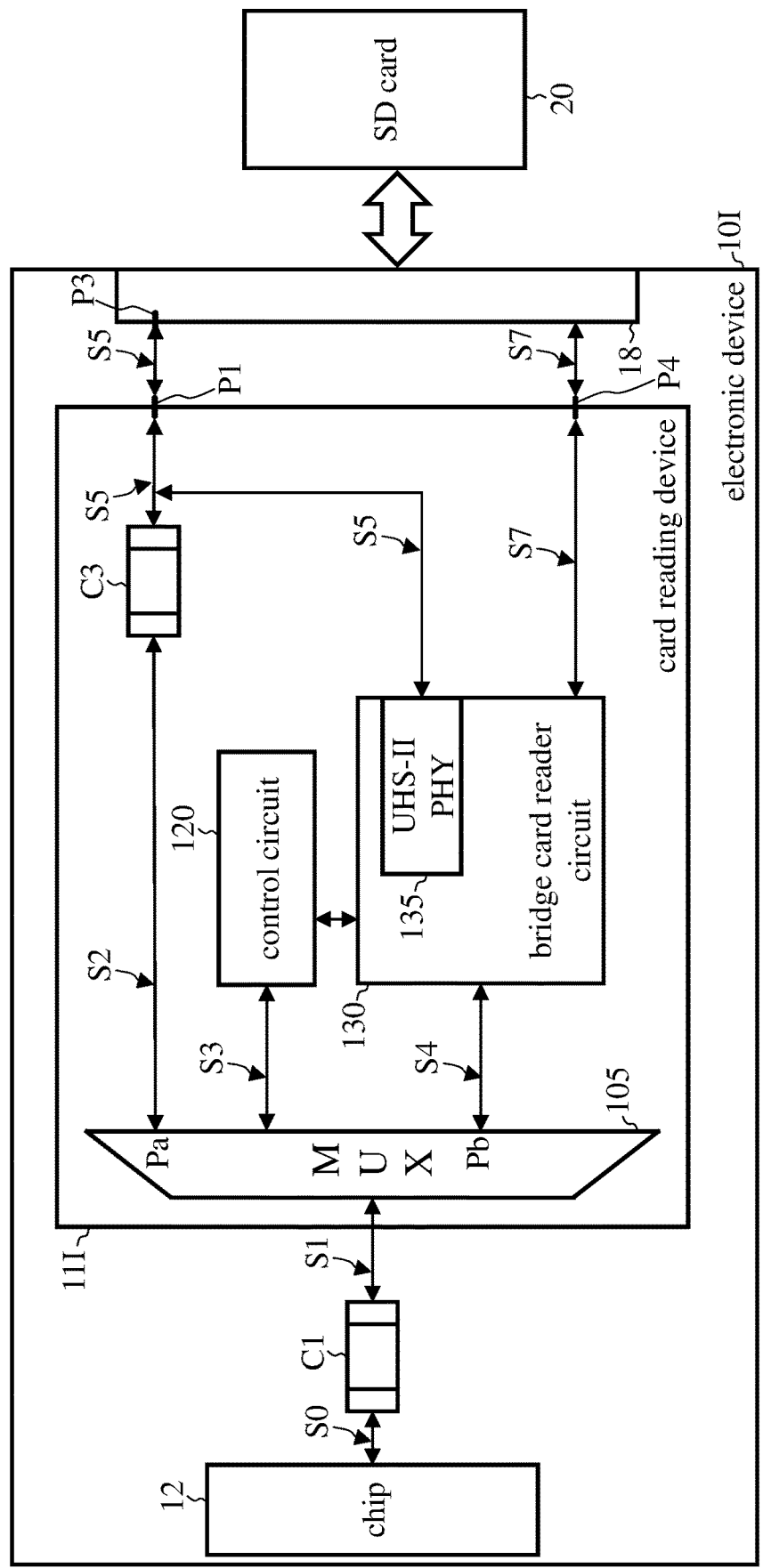

FIG. 9 is a functional block diagram of the electronic device according to another embodiment of the present invention. The electronic device 10I includes a chip 12, a capacitor C1, a card reading device 11I, and a memory card slot 18. The card reading device 11I is similar to the card reading device 11E, but the card reading device 11I further includes a capacitor C3. The first end of the capacitor C3 is coupled or electrically connected to the pin P1 and the bridge card reader circuit 130, while the second end of the capacitor C3 is coupled or electrically connected to the selection circuit 105 (i.e., the second end of the capacitor C3 outputs or receives the signal S2). In other words, in the embodiment of FIG. 9, when being transmitted in a direction from the memory card slot 18 to the card reading device 11I, the signal S5 contains both the DC component and the AC component, whereas the signal S2 contains only the AC component but does not contain the DC component; when being transmitted in a direction from the card reading device 11I to the memory card slot 18, the signal S2 may contain both the DC component and the AC component, whereas the signal S5 contains only the AC component but does not contain the DC component. Note that when the signal transmitted between the endpoint Pa and the pin P1 is a PCIe signal, the signal S5 and the signal S2 are both PCIe signals. In comparison with the embodiment of FIG. 1, the card reading device 11I has fewer pins, which reduces the traces on the circuit board and in turn reduces the area and cost of the circuit board.

Figure 10:
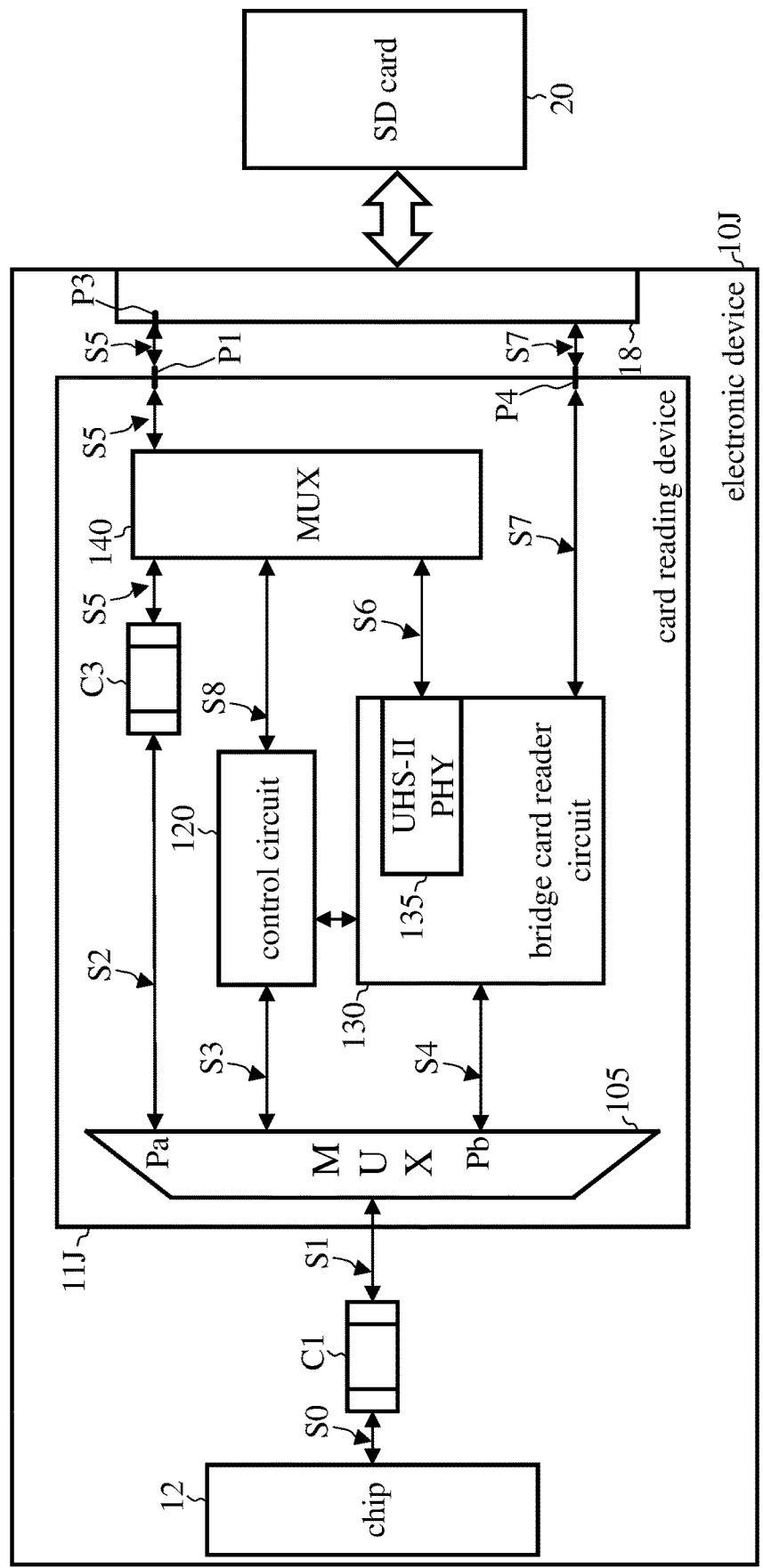

FIG. 10 is a functional block diagram of the electronic device according to another embodiment of the present invention. The electronic device 10J includes a chip 12, a capacitor C1, a card reading device 11J, and a memory card slot 18. The card reading device 11J is similar to the card reading device 11I, but the card reading device 11J further includes a selection circuit 140. The selection circuit 140 is coupled or electrically connected to the control circuit 120, the pin P1, the capacitor C3, and the bridge card reader circuit 130. One end of the capacitor C3 is coupled or electrically connected to the selection circuit 140, while the other end of the capacitor C3 is coupled or electrically connected to the selection circuit 105.

The control circuit 120 controls the selection circuit 140 through the control signal S8 according to the type of the SD card 20. More specifically, when the SD card 20 is an SD Express card, the control circuit 120 controls the selection circuit 140 to establish a path between the capacitor C3 and the pin P1 and to disconnect the bridge card reader circuit 130 and the pin P1; when the SD card 20 is a UHS-II SD card, the control circuit 120 controls the selection circuit 140 to disconnect the capacitor C3 and the pin P1 and to establish a path between the bridge card reader circuit 130 and the pin P1 (so that the signal S6 the signal S5 are identical).

When the bridge card reader circuit 130 and the pin P1 are disconnected, the impedance between the bridge card reader circuit 130 and the pin P1 increases; as a result, most of the signal S5 is transmitted to the capacitor C3 through the selection circuit 140, which contributes to the improvement in the quality of the PCIe signals (i.e., the signal S5 and the signal S2) of the SD Express card.

Figure 11:
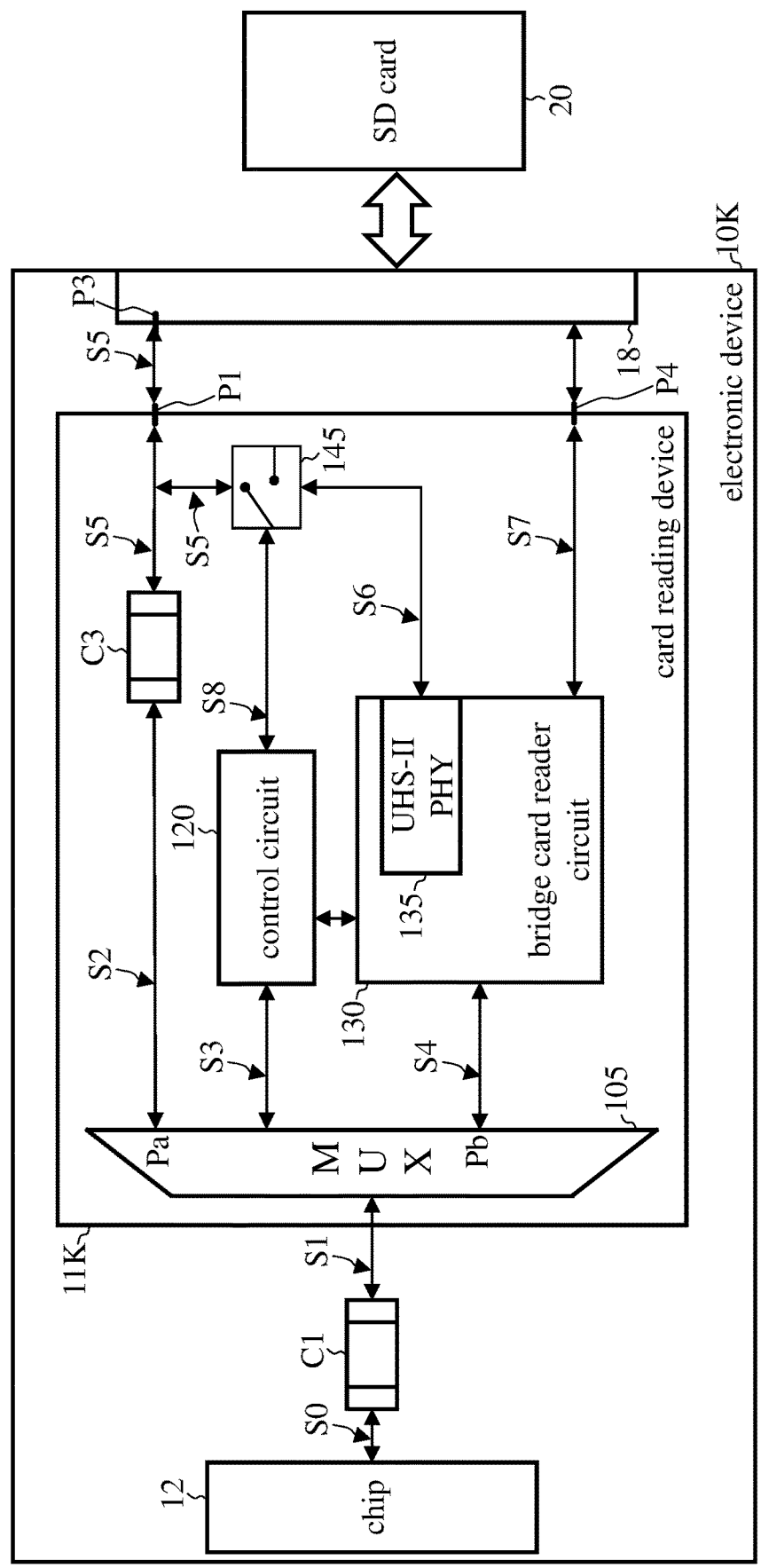

FIG. 11 is a functional block diagram of the electronic device according to another embodiment of the present invention. The electronic device 10K includes a chip 12, a capacitor C1, a card reading device 11K, and a memory card slot 18. The card reading device 11K is similar to the card reading device 11I, but the card reading device 11K further includes a switch circuit 145. The switch circuit 145 is coupled or electrically connected to the control circuit 120, the pin P1, the capacitor C3, and the bridge card reader circuit 130.

The control circuit 120 controls the switch circuit 145 through the control signal S8 according to the type of the SD card 20. More specifically, when the SD card 20 is an SD Express card, the control circuit 120 controls the switch circuit 145 to disconnect the bridge card reader circuit 130 and the pin P1; when the SD card 20 is a UHS-II SD card, the control circuit 120 controls the switch circuit 145 to establish a signal path between the bridge card reader circuit 130 and the pin P1 (so that the signal S6 and the signal S5 are identical).

Similarly, when the bridge card reader circuit 130 and the pin P1 are disconnected, the quality of the PCIe signals (i.e., the signal S5 and the signal S2) of the SD Express card can be improved.

Figure 12:
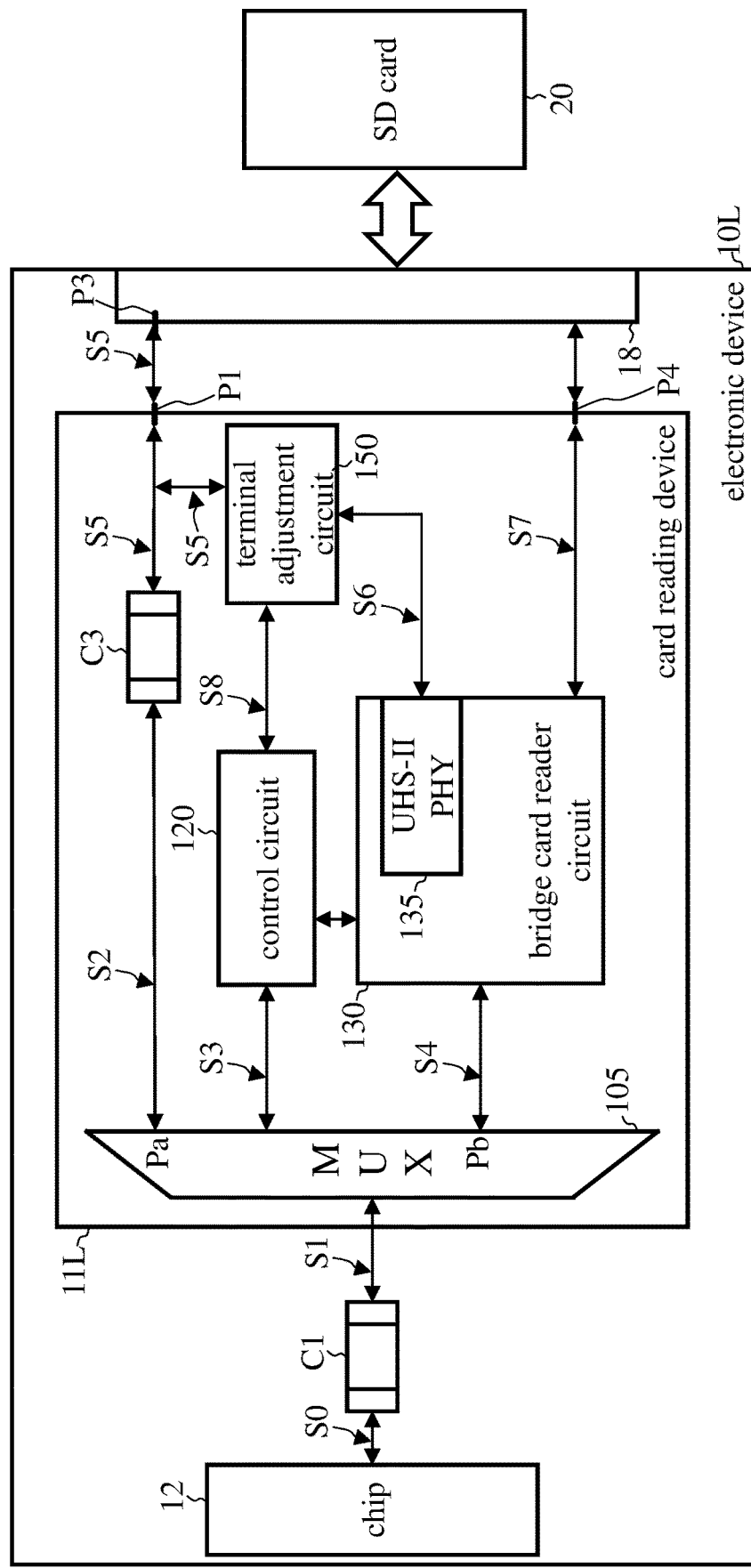

FIG. 12 is a functional block diagram of the electronic device according to another embodiment of the present invention. The electronic device 10L includes a chip 12, a capacitor C1, a card reading device 11L, and a memory card slot 18. The card reading device 11L is similar to the card reading device 11I, but the card reading device 11L further includes a terminal adjustment circuit 150. The terminal adjustment circuit 150 is coupled or electrically connected to the control circuit 120, the pin P1, the capacitor C3, and the bridge card reader circuit 130.

The control circuit 120 controls the terminal adjustment circuit 150 through the control signal S8 according to the type of the SD card 20. More specifically, when the SD card 20 is an SD Express card, the control circuit 120 controls the terminal adjustment circuit 150 to have a first impedance (e.g., a relatively high impedance that leads to a reduction in the interference of the trace stub with the PCIe signal (i.e., the signal S5), the trace stub being connected to the bridge card reader circuit 130); when the SD card 20 is a UHS-II SD card, the control circuit 120 controls the terminal adjustment circuit 150 to have a second impedance (e.g., a relatively low impedance that leads to the establishment of a path between the bridge card reader circuit 130 and the pin P1 so that the signal S6 is identical to the signal S5). In some embodiments, the first impedance is greater than the second impedance.

The above-mentioned pins P1, P2, P3, and P4 can each represent one or more pins. People having ordinary skill in the art can design the control circuit 120 according to the above discussions; that is to say, the control circuit 120 can be an application specific integrated circuit (ASIC) or embodied by circuits or hardware such as a programmable logic device (PLD).

To sum up, the present invention provides various card reading devices that support various types of SD cards. The present invention also provides various electronic devices that use the card reading devices.

FIG. 13 shows the pin numbers of SD cards (the legacy SD card, UHS-II SD card, and SD Express card), which comply with the SD card specification formulated by the Secure Digital Association. For the descriptions and details of the pins, please refer to the Physical Layer Simplified Specification on the website of the SD Association (www.sd-card.org/downloads/pls/). In other words, the definitions or associated implementation details of the pins or signals (e.g., clock RCLK+/−, clock REFCLK+/−, signal PERST #, CLKREQ #, etc.) listed in FIG. 13 can be found in the SD card specification.

In the embodiments of FIGS. 1 to 12, the control circuit 120 communicates (including but not limited to transmitting/receiving clocks, commands, data, etc.) with the SD card 20 through the pins P1, P2, P4 and/or other pins (not shown) of the card reading device 11 (e.g., any one of 11A to 11L). For ease of reading, the lines that connect the pins with the control circuit 120 as well as with the memory card slot 18 are omitted in FIGS. 1 to 12.

Figure 14:
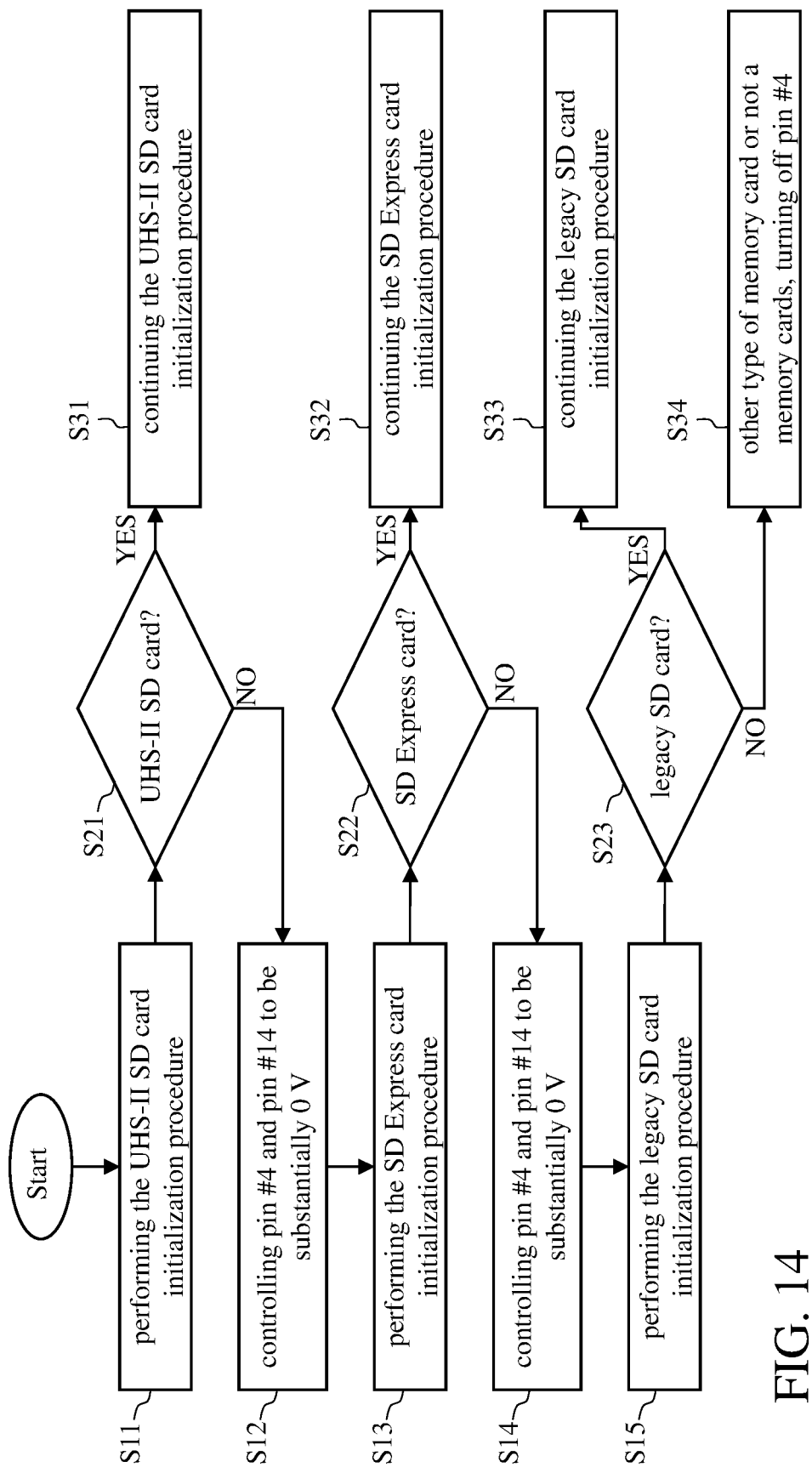
FIG. 14 shows a flowchart of a method of identifying the type of a memory card according to an embodiment of the present invention.

FIG. 14 shows a flowchart of a method of identifying the type of a memory card according to an embodiment of the present invention. This method can be performed by the card reading device 11 and includes the following steps.

Step S11: performing the UHS-II SD card initialization procedure on the SD card 20. The details of step S11 are to be discussed below in connection with FIG. 15.

Step S21: determining whether the SD card 20 is a UHS-II SD card. If the result is YES, then the flow proceeds to step S31; otherwise, to step S12. The details of step S21 are to be discussed below in connection with FIG. 16.

Step S31: continuing the UHS-II SD card initialization procedure (please refer to the SD card specification for details).

Step S12: controlling pin #4 and pin #14 to be substantially 0 volts (V) (i.e., equivalent to turning off pin #4 and pin #14). Note that "to be substantially a certain voltage" means to be equal to or approximately that voltage.

Step S13: performing the SD Express card initialization procedure on the SD card 20. The details of step S13 are to be discussed below in connection with FIG. 17.

Step S22: determining whether the SD card 20 is an SD Express card. If the result is YES, then the flow proceeds to step S32; otherwise, to step S14. The details of step S22 are to be discussed below in connection with FIG. 18.

Step S32: continuing the SD Express card initialization procedure (please refer to the SD card specification for details).

Step S14: Step S14 is identical to step S12.

Step S15: performing the legacy SD card initialization procedure on the SD card 20. The details of step S15 are to be discussed below in connection with FIG. 19.

Step S23: determining whether the SD card 20 is a legacy SD card. If the result is YES, then the flow proceeds to step S33; otherwise, to step S34. The details of step S23 are to be discussed below in connection with FIG. 20.

Step S33: continuing the legacy SD card initialization procedure (please refer to the SD card specification for details).

Step S34: controlling pin #4 to be substantially 0 V as a result of the SD card 20 being other type of memory card or not a memory card.

Figure 15:
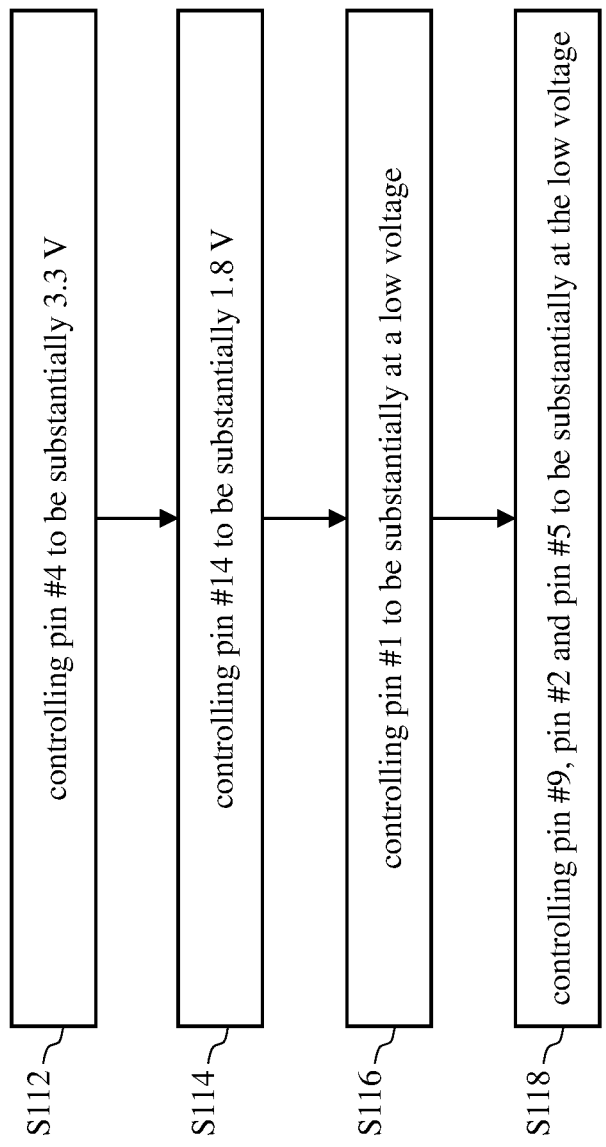
FIG. 15 shows a flowchart of step S11 in FIG. 14 according to an embodiment.

FIG. 15 shows a flowchart of step S11 in FIG. 14 according to an embodiment, including the following steps.

Step S112: controlling pin #4 to be substantially 3.3 V.

Step S114: controlling pin #14 to be substantially 1.8 V.

Step S116: controlling pin #1 to be substantially at a low voltage (e.g., 0 V). In reference to FIG. 13, since the SD card specification does not define pin #1 in the UHS-II mode, pin #1 can be at either a high voltage or a low voltage for the UHS-II mode. However, for the PCIe mode, the SD Express card does not operate when pin #1 (i.e., PERST #) is at the low voltage. Therefore, step S116 can prevent the SD Express card from being abnormal in UHS-II card initialization procedure.

Step S118: controlling pin #9, pin #2 and pin #5 to be substantially at the low voltage (e.g., 0 V). In reference to FIG. 13, since the SD card specification does not define pin #9, pin #2, and pin #5 in the UHS-II mode, these three pins can be at a high voltage or a low voltage for the UHS-II mode. Note that, in some embodiments, step S118 is optional.

Figure 16:
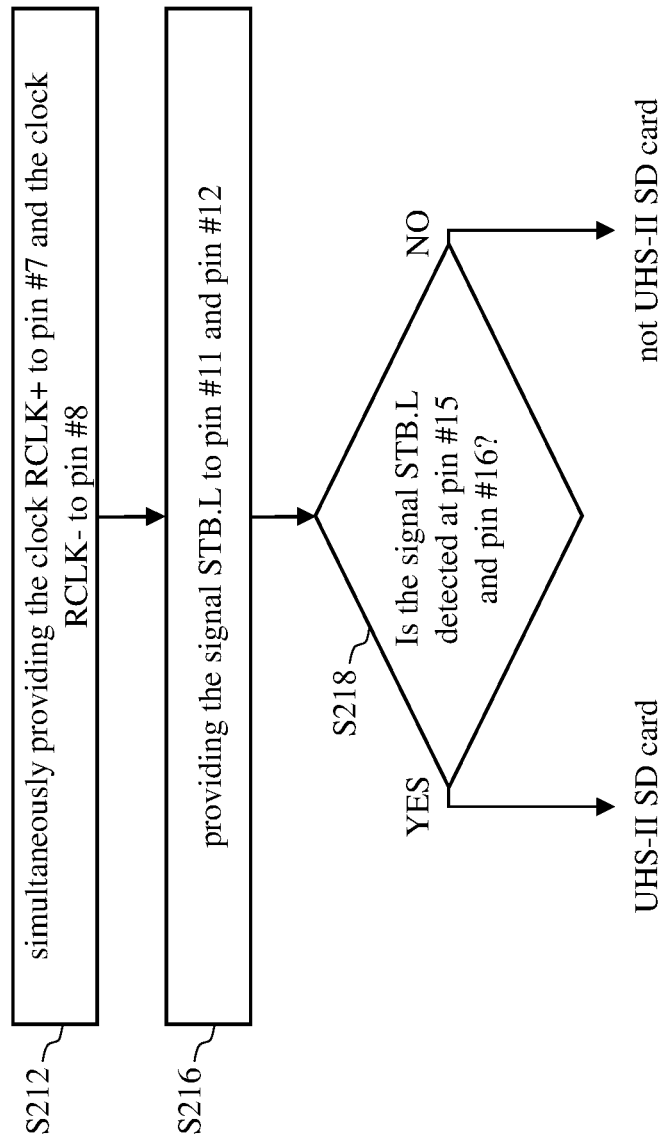
FIG. 16 shows a flowchart of step S21 in FIG. 14 according to an embodiment.

FIG. 16 shows a flowchart of step S21 in FIG. 14 according to an embodiment, including the following steps.

Step S212: simultaneously providing the clock RCLK+ to pin #7 and the clock RCLK− to pin #8.

Step S216: providing the signal STB.L to pin #11 and pin #12. Please refer to the SD card specification for the definition or implementation details of the signal STB.L.

Step S218: determining whether the signal STB.L is detected at pin #15 and pin #16. If the result is YES, the control circuit 120 can determine that the SD card 20 is a UHS-II SD card; otherwise, the SD card 20 is not a UHS-II SD card.

Figure 17:
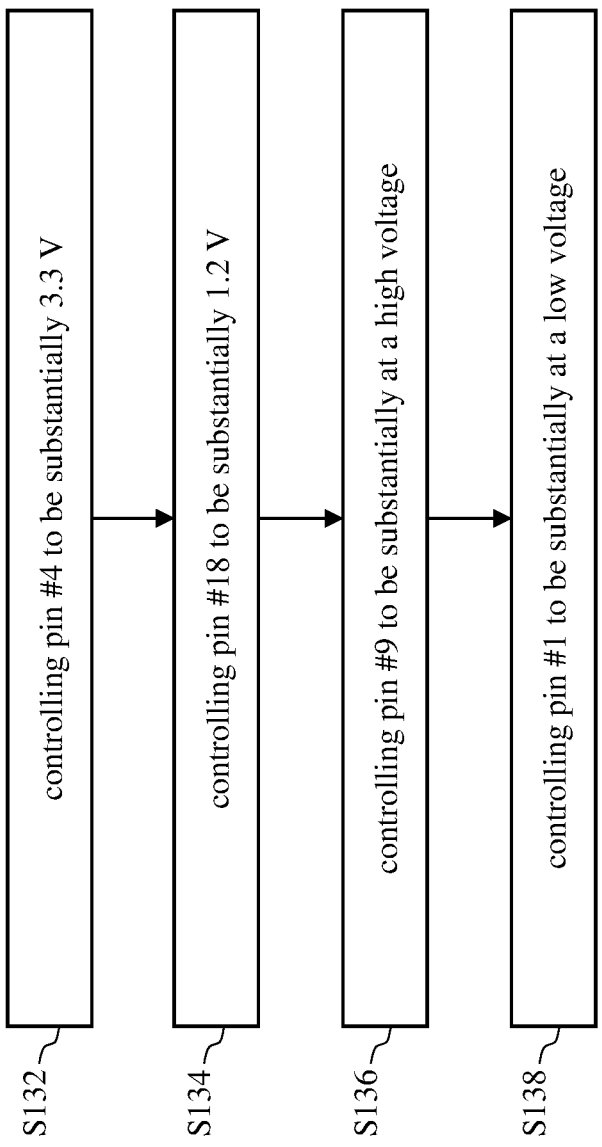
FIG. 17 shows a flowchart of step S13 in FIG. 14 according to an embodiment.

FIG. 17 shows a flowchart of step S13 in FIG. 14 according to an embodiment, including the following steps.

Step S132: controlling pin #4 to be substantially 3.3 V.

Step S134: controlling pin #18 to be substantially 1.2 V.

Step S136: controlling pin #9 to be substantially at a high voltage (e.g., 3.3 V).

Step S138: controlling pin #1 to be substantially at a low voltage (e.g., 0 V).

Figure 18:
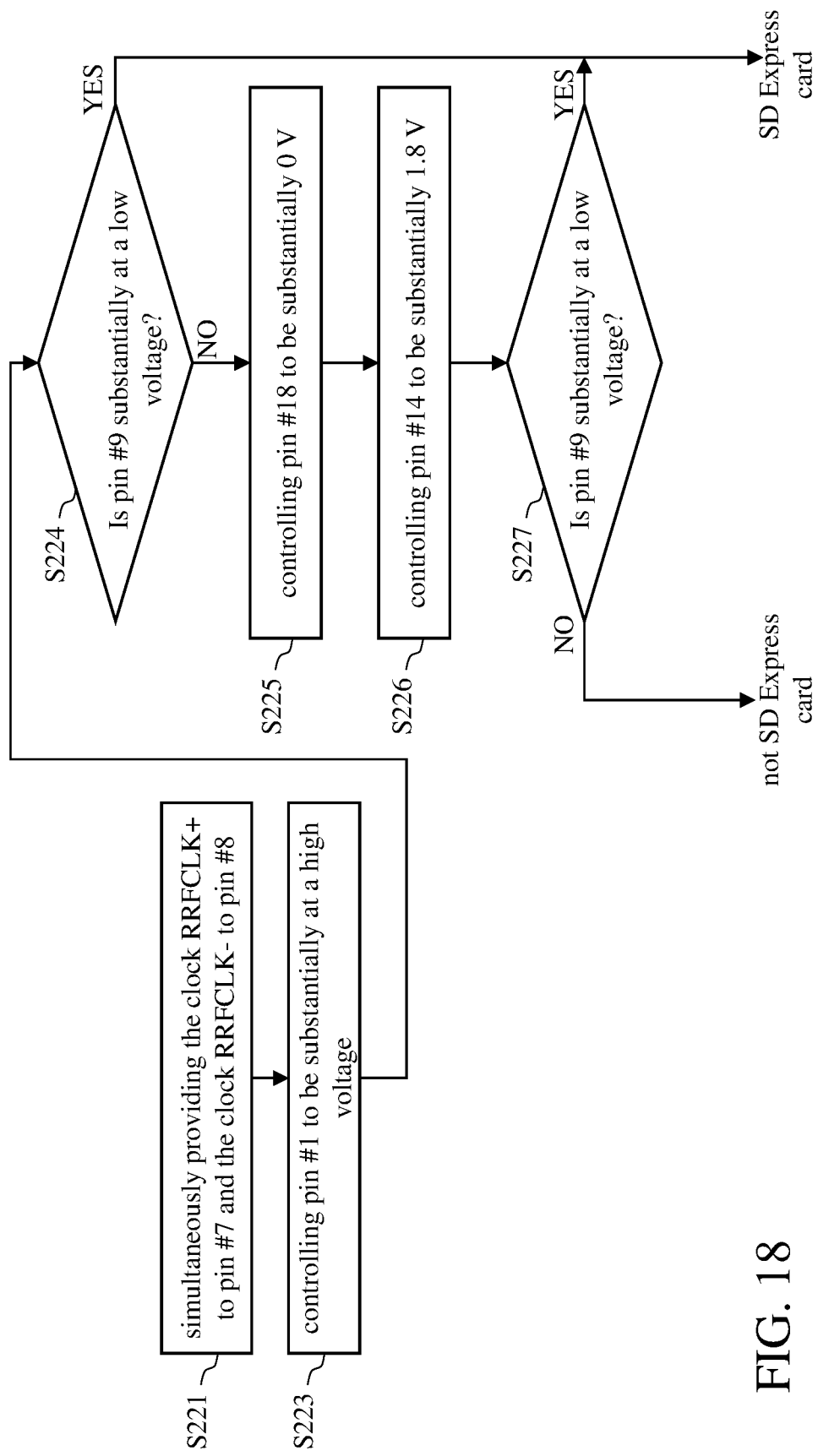
FIG. 18 shows a flowchart of step S22 in FIG. 14 according to an embodiment.

FIG. 18 shows a flowchart of step S22 in FIG. 14 according to an embodiment, including the following steps.

Step S221: simultaneously providing the clock RRFCLK+ to pin #7 and the clock RRFCLK− to pin #8.

Step S223: controlling pin #1 to be substantially at a high voltage (e.g., 3.3 V).

Step S224: determining whether pin #9 is substantially at a low voltage (e.g., 0 V). If the result is YES, the control circuit 120 can determine that the SD card 20 is an SD Express card; otherwise, the flow proceeds to step S225.

Step S225: controlling pin #18 to be substantially 0 V (i.e., equivalent to turning off pin #18).

Step S226: controlling pin #14 to be substantially 1.8 V.

Step S227: determining whether pin #9 is substantially at a low voltage (e.g., 0 V). If the result is YES, the control circuit 120 can determine that the SD card 20 is an SD Express card; otherwise, the SD card 20 is not an SD Express card.

Figure 19:
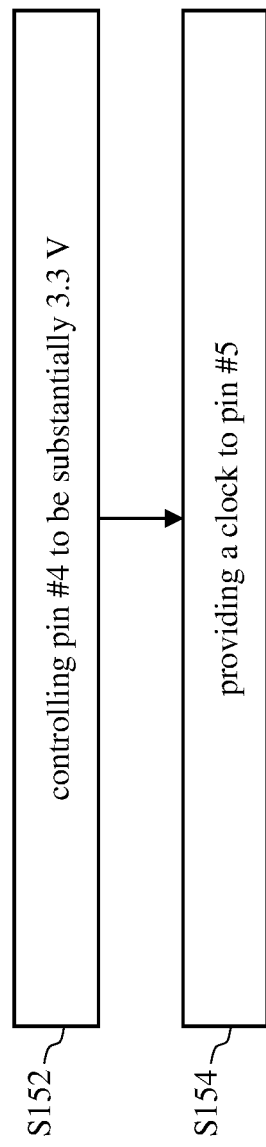
FIG. 19 shows a flowchart of step S15 in FIG. 14 according to an embodiment.

FIG. 19 shows a flowchart of step S15 in FIG. 14 according to an embodiment, including the following steps.

Step S152: controlling pin #4 to be substantially 3.3 V.

Step S154: providing a clock to pin #5.

Figure 20:
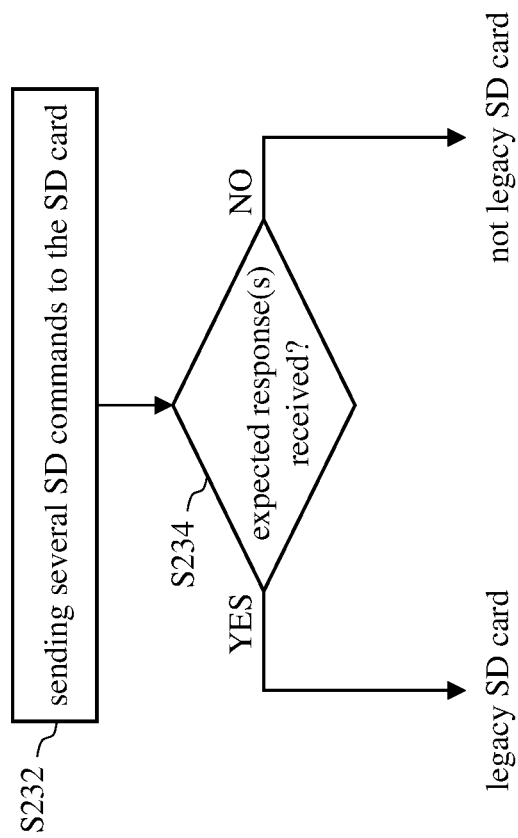
FIG. 20 shows a flowchart of step S23 in FIG. 14 according to an embodiment.

FIG. 20 shows a flowchart of step S23 in FIG. 14 according to an embodiment, including the following steps.

Step S232: sending several SD commands to the SD card 20 via pin #2.

Step S234: determining whether expected response(s) is(are) received. If the result is YES, the control circuit 120 can determine that the SD card 20 is a legacy SD card; otherwise, the SD card 20 is not a legacy SD card.

In some embodiments, please refer to page 36 of the SD Card Specification Version 7.10 (www.sdcard.org/downloads/pls/archives/) for the above-mentioned several SD commands and the expected responses.

Figure 21:
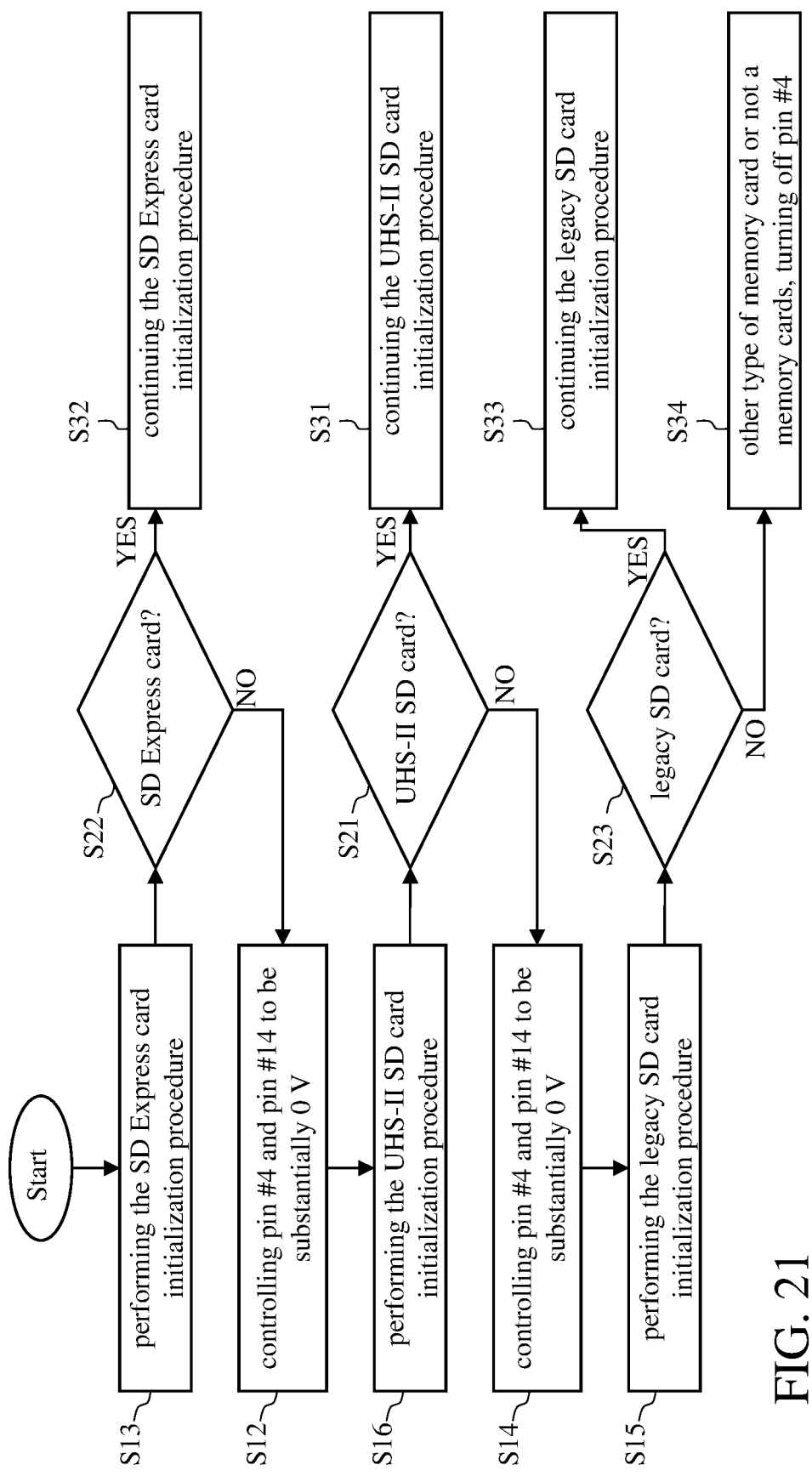
FIG. 21 shows a flowchart of a method of identifying the type of a memory card according to another embodiment of the present invention.

FIG. 21 shows a flowchart of a method of identifying the type of a memory card according to another embodiment of the present invention. FIG. 21 is similar to FIG. 14, except that the flow of FIG. 21 first determines whether the SD card 20 is an SD Express card, and then determines whether the SD card 20 is a UHS-II SD card; therefore, please refer to the discussions of FIG. 14 for the details of FIG. 21. However, step S16 is slightly different from step S11, and the details of step S16 are to be discussed below in connection with FIG. 22.

Figure 22:
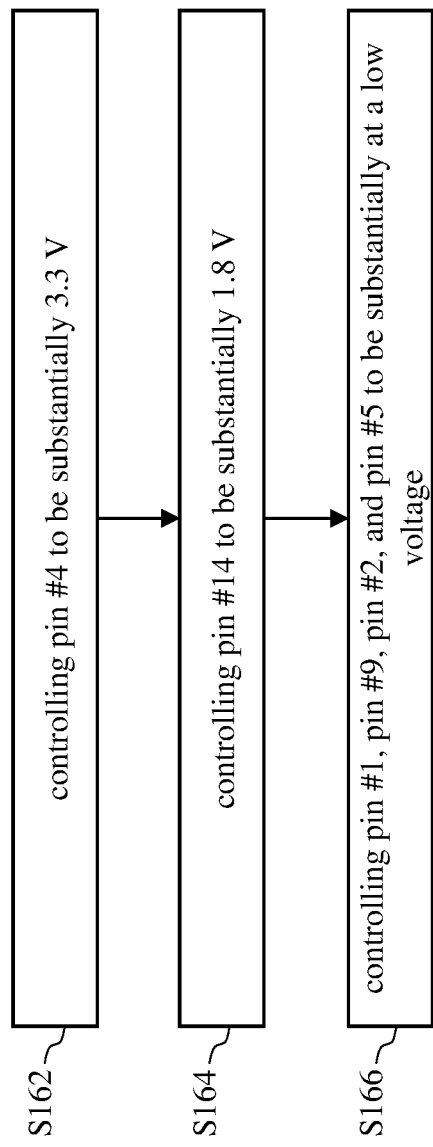
FIG. 22 shows a flowchart of step S16 in FIG. 21 according to an embodiment.

FIG. 22 shows a flowchart of step S16 in FIG. 21 according to an embodiment, including the following steps.

Step S162: controlling pin #4 to be substantially 3.3 V.

Step S164: controlling pin #14 to be substantially 1.8 V.

Step S166: controlling pin #1, pin #9, pin #2, and pin #5 to be substantially at a low voltage (e.g., 0 V). Note that, in some embodiments, step S166 is optional.

Figure 23:
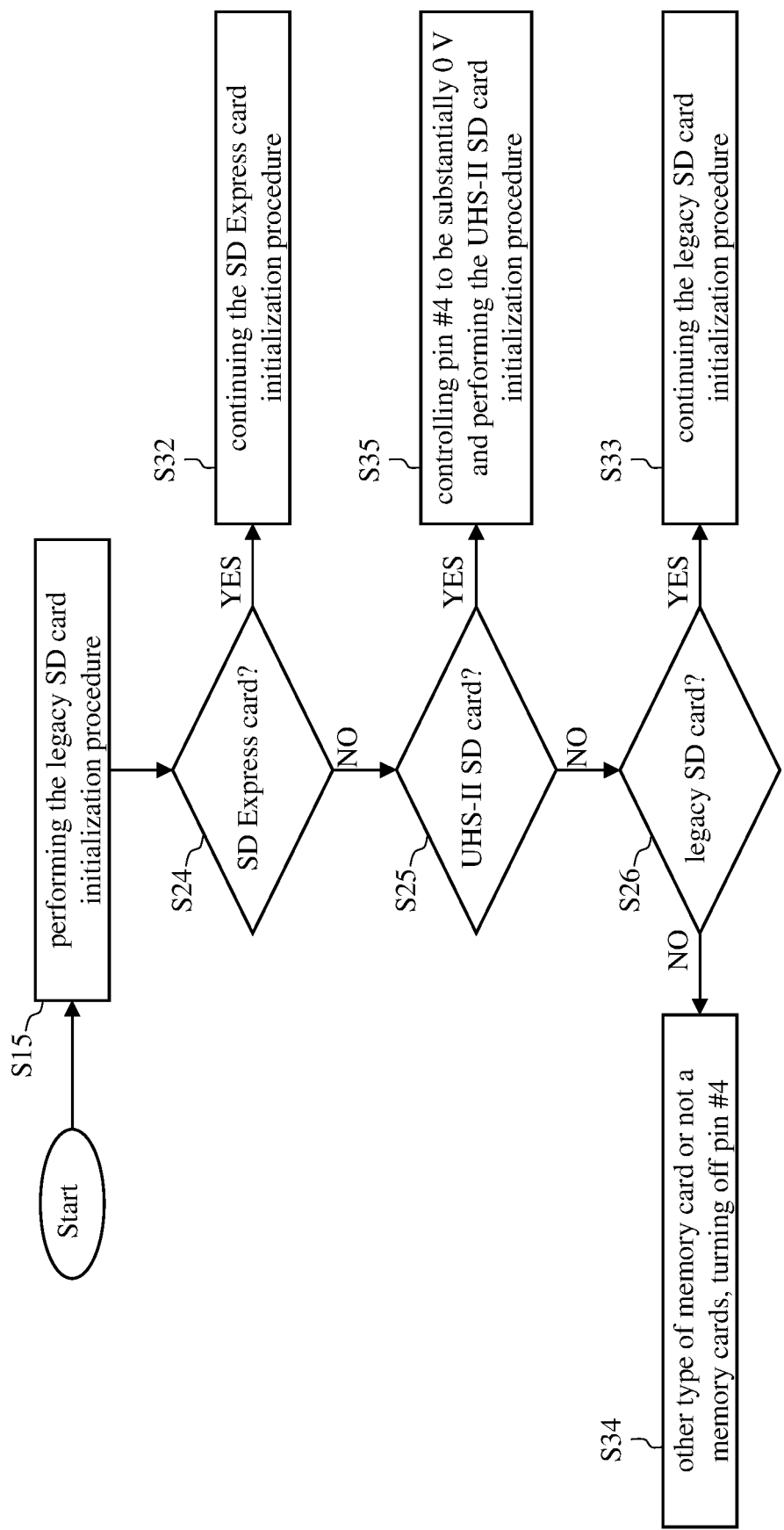
FIG. 23 shows a flowchart of a method of identifying the type of a memory card according to another embodiment of the present invention.

FIG. 23 shows a flowchart of a method of identifying the type of a memory card according to another embodiment of the present invention. This method can be performed by the card reading device 11 and includes the following steps.

Step S15: performing a legacy SD card initialization procedure on the SD card 20. The details of step S15 are shown in FIG. 19.

Step S24: determining whether the SD card 20 is an SD Express card. If the result is YES, then the flow proceeds to step S32; otherwise, to step S25. The details of step S24 are to be discussed below in connection with FIG. 24.

Step S32: continuing the SD Express card initialization procedure (please refer to the SD card specification for details).

Step S25: determining whether the SD card 20 is a UHS-II SD card. If the result is YES, then the flow proceeds to step S35; otherwise, to step S26. The details of step S25 are to be discussed below in connection with FIG. 25.

Step S35: controlling pin #4 to be substantially 0 V and performing the UHS-II SD card initialization procedure on the SD card 20 (please refer to the SD card specification for the initialization details).

Step S26: determining whether the SD card 20 is a legacy SD card. If the result is YES, then the flow proceeds to step S33; otherwise, to step S34. The details of step S26 are to be discussed below in connection with FIG. 26.

Step S33: continuing the legacy SD card initialization procedure (please refer to the SD card specification for details).

Step S34: step S34 is identical to step S34 in FIG. 14.

Figure 24:
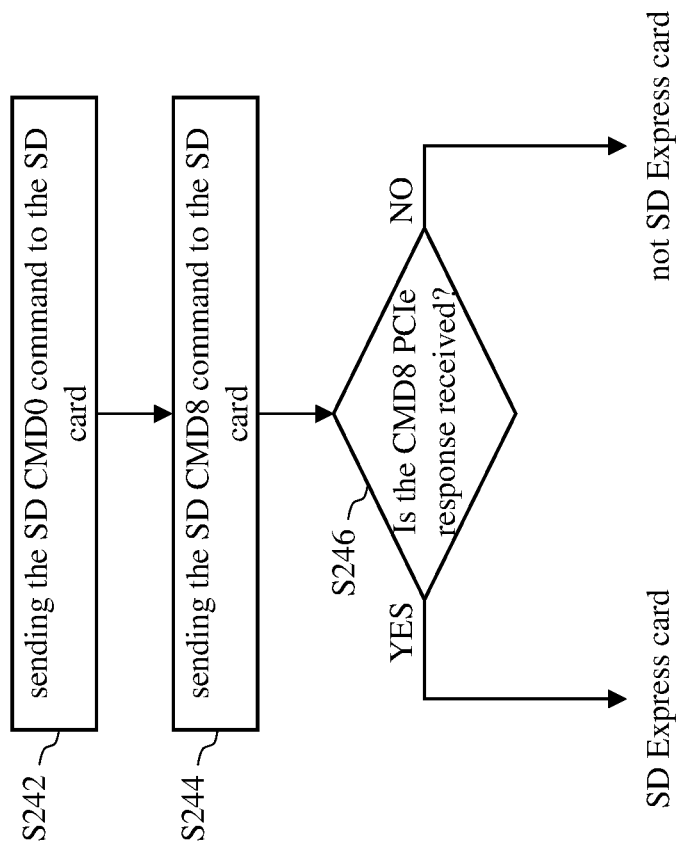
FIG. 24 shows a flowchart of step S24 in FIG. 23 according to an embodiment.

FIG. 24 shows a flowchart of step S24 in FIG. 23 according to an embodiment, including the following steps.

Step S242: sending the SD CMD0 command to the SD card 20 via pin #2.

Step S244: sending the SD CMD8 command to the SD card 20 via pin #2.

Step S246: determining whether the CMD8 PCIe response is received. More specifically, this step is to determine whether the "PCIe response" field in the CMD8 PCIe response indicates that the SD card 20 is an SD Express card. If the result is YES, the control circuit 120 can determine that the SD card 20 is an SD Express card; otherwise, the SD card 20 is not an SD Express card.

Please refer to page 81 of the Secure Digital Card Specification Version 7.10 for the SD CMD0 command, SD CMD8 command, and CMD8 PCIe response.

Figure 25:
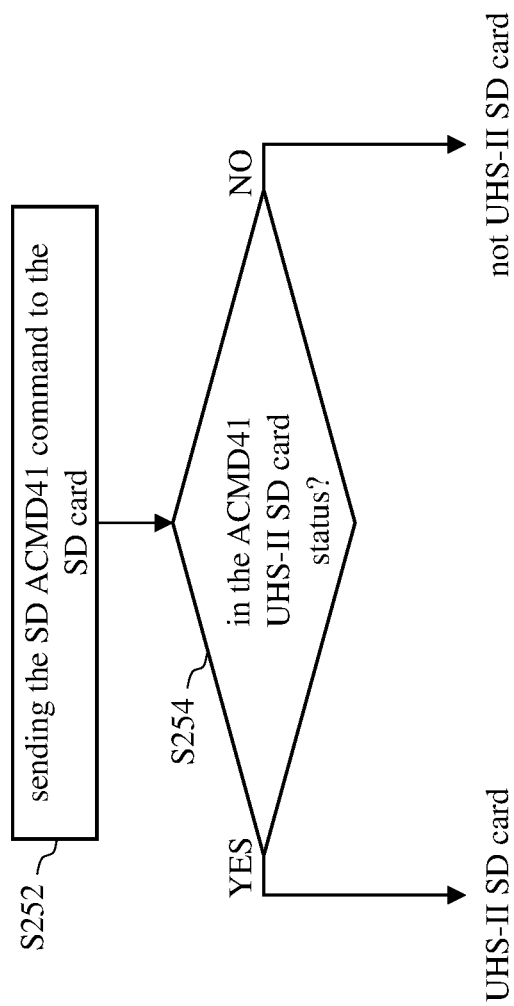
FIG. 25 shows a flowchart of step S25 in FIG. 23 according to an embodiment.

FIG. 25 shows a flowchart of step S25 in FIG. 23 according to an embodiment, including the following steps.

Step S252: sending the SD ACMD41 command to the SD card 20 via pin #2.

Step S254: determining whether the SD card 20 is in the ACMD41 UHS-II SD card status. More specifically, this step is to determine whether the "UHS-II status" field in the response of the SD card 20 indicates that the SD card 20 is a UHS-II SD card. If the result is YES, the control circuit 120 can determine that the SD card 20 is a UHS-II SD card; otherwise, the SD card 20 is not a UHS-II SD card.

Please refer to page 39 of the Secure Digital Card Specification Version 7.10 for the details of the SD ACMD41 command and ACMD41 UHS-II SD card status.

Figure 26:
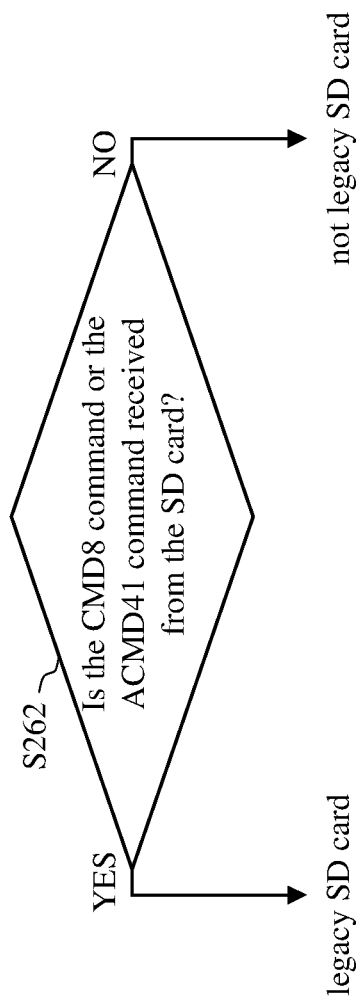
FIG. 26 shows a flowchart of step S26 in FIG. 23 according to an embodiment.

FIG. 26 shows a flowchart of step S26 in FIG. 23 according to an embodiment, including the following steps.

Step S262: determining whether the CMD8 command or the ACMD41 command is received from the SD card 20. If the result is YES, the control circuit 120 can determine that the SD card 20 is a legacy SD card; otherwise, the SD card 20 is not a legacy SD card.

Figure 27:
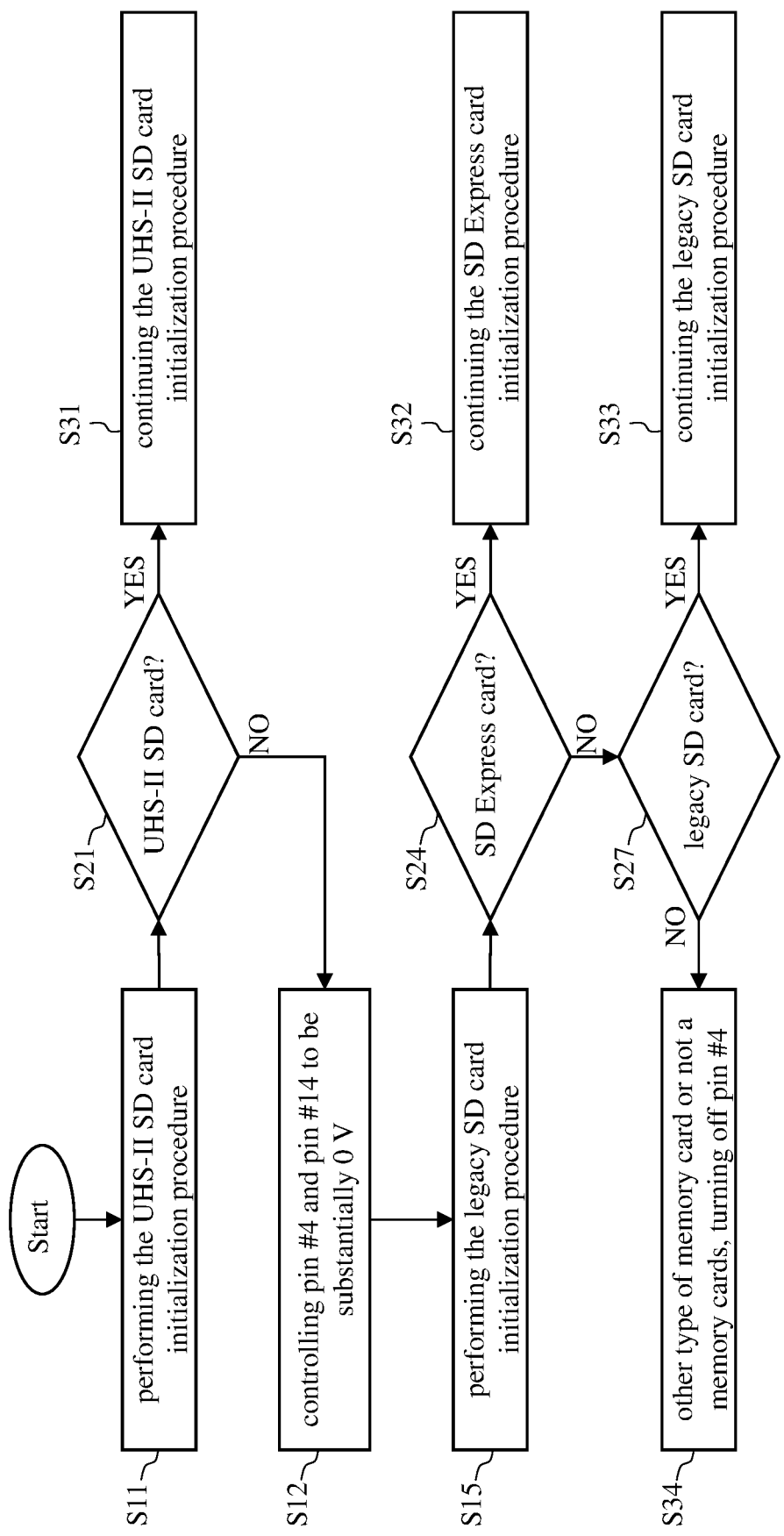
FIG. 27 shows a flowchart of a method of identifying the type of a memory card according to another embodiment of the present invention.

FIG. 27 shows a flowchart of a method of identifying the type of a memory card according to another embodiment of the present invention. This method can be performed by the card reading device 11 and includes the following steps.

Step S11: performing the UHS-II SD card initialization procedure on the SD card 20. The details of step S11 are shown in FIG. 15.

Step S21: determining whether the SD card 20 is a UHS-II SD card. If the result is YES, then the flow proceeds to step S31; otherwise, to step S12. The details of step S21 are shown in FIG. 16.

Step S31: continuing the UHS-II SD card initialization procedure (please refer to the SD card specification for details).

Step S12: controlling pin #4 to be substantially 0 V and pin #14 to be substantially 0 V.

Step S15: performing a legacy SD card initialization procedure on the SD card 20. The details of step S15 are shown in FIG. 19.

Step S24: determining whether the SD card 20 is an SD Express card. If the result is YES, then the flow proceeds to step S32; otherwise, to step S27. The details of step S24 are shown in FIG. 24.

Step S32: continuing the SD Express card initialization procedure (please refer to the SD card specification for details).

Step S27: determining whether the SD card 20 is a legacy SD card. If the result is YES, then the flow proceeds to step S33; otherwise, to step S34. The details of step S27 are to be discussed below in connection with FIG. 28.

Step S33: continuing the legacy SD card initialization procedure (please refer to the SD card specification for details).

Step S34: step S34 is identical to step S34 in FIG. 14.

Figure 28:
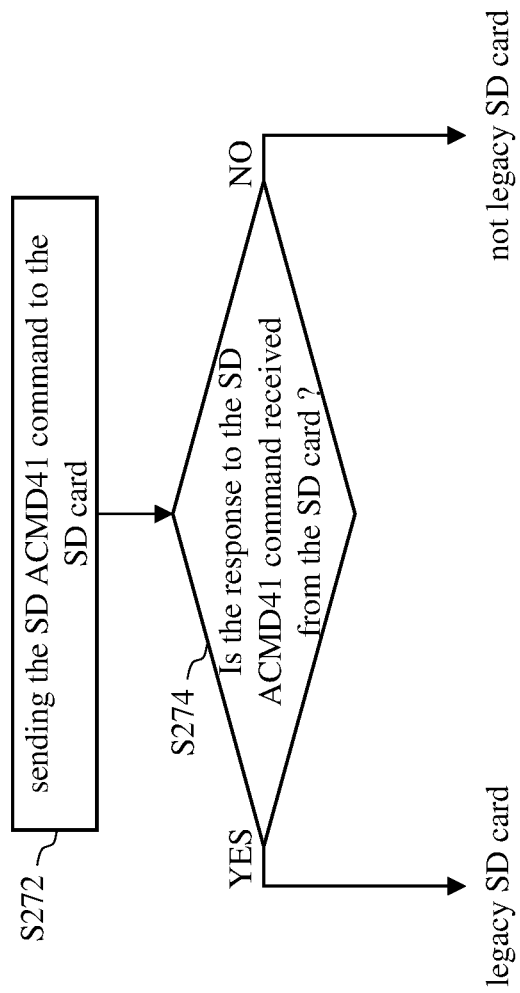
FIG. 28 shows a flowchart of step S27 in FIG. 27 according to an embodiment.

FIG. 28 shows a flowchart of step S27 in FIG. 27 according to an embodiment, including the following steps.

Step S272: sending the SD ACMD41 command to the SD card 20 via pin #2.

Step S274: determining whether the response to the SD ACMD41 command is received from the SD card 20. If the result is YES, the control circuit 120 can determine that the SD card 20 is a legacy SD card; otherwise, the SD card 20 is not a legacy SD card.

To sum up, four methods (FIG. 14, FIG. 21, FIG. 23, and FIG. 27) of identifying the type of a memory card are also provided in this disclosure. The devices or circuits in FIGS. 1 to 12 can use any of the four methods to determine the type of the SD card 20.

The legacy SD cards, SD Express cards, and UHS-II SD cards are given for illustrative purposes only, rather than to limit the scope of the claimed invention; people having ordinary skill in the art may apply the present invention to other types of SD cards.

Since a person having ordinary skill in the art can appreciate the implementation detail and the modification thereto of the present method invention through the disclosure of the device invention, repeated and redundant description is thus omitted. Please note that the shape, size, and ratio of any element in the disclosed figures are exemplary for understanding, not for limiting the scope of this invention. Furthermore, there is no step sequence limitation for the method inventions as long as the execution of each step is applicable. In some instances, the steps can be performed simultaneously or partially simultaneously.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A method of identifying a type of a Secure Digital (SD) card whose pin numbers comply with an SD card specification formulated by the Secure Digital Association, the method comprising:
    (A) performing one of an Ultra High Speed type II (UHS-II) SD card initialization procedure and an SD Express card initialization procedure on the SD card;
    (B) controlling pin #4 of the SD card to be substantially zero volts;
    (C) controlling pin #14 of the SD card to be substantially zero volts;
    (D) performing another of the UHS-II SD card initialization procedure and the SD Express card initialization procedure on the SD card; and
    (E) determining whether the SD card is a UHS-II SD card or an SD Express card;
    wherein the SD card is not removed between step (A) and step (D).

2. The method of claim 1, wherein the step of performing the UHS-II SD card initialization procedure on the SD card comprises:
    controlling pin #4 of the SD card to be substantially 3.3 volts; and
    controlling pin #14 of the SD card to be substantially 1.8 volts.

3. The method of claim 2, wherein the step of performing the UHS-II SD card initialization procedure on the SD card further comprises:
    controlling pin #1 of the SD card to be substantially at a low voltage.

4. The method of claim 1, wherein the step of determining whether the SD card is the UHS-II SD card comprises:
    providing a first clock to pin #7 of the SD card;
    providing a second clock to pin #8 of the SD card; and
    providing a signal STB.L to pin #11 and pin #12 of the SD card.

5. The method of claim 1, wherein the step of performing the SD Express card initialization procedure on the SD card comprises:
    controlling pin #4 of the SD card to be substantially 3.3 volts;
    controlling pin #18 of the SD card to be substantially 1.2 volts;
    controlling pin #9 of the SD card to be substantially at a high voltage; and
    controlling pin #1 of the SD card to be substantially at a low voltage.

6. The method of claim 1, wherein the step of determining whether the SD card is the SD Express card comprises:
    providing a first clock to pin #7 of the SD card;
    providing a second clock to pin #8 of the SD card;
    controlling pin #1 of the SD card to be substantially at a high voltage;
    determining whether pin #9 of the SD card is substantially at a low voltage; and
    determining that the SD card is the SD Express card when pin #9 of the SD card is substantially at the low voltage.

7. The method of claim 6, wherein the step of determining whether the SD card is the SD Express card further comprises:
controlling pin #18 of the SD card to be substantially zero volts and controlling pin #14 of the SD card to be substantially 1.8 volts when pin #9 of the SD card is not substantially at the low voltage;
determining whether pin #9 of the SD card is substantially at the low voltage; and
determining that the SD card is the SD Express card when pin #9 of the SD card is substantially at the low voltage.

8. The method of claim 1 further performing following steps when the SD card is not the UHS-II SD card and not the SD Express card:
controlling pin #4 of the SD card to be substantially zero volts;
controlling pin #14 of the SD card to be substantially zero volts;
performing a legacy SD card initialization procedure on the SD card; and
determining whether the SD card is a legacy SD card.

9. The method of claim 8, wherein the step of performing the legacy SD card initialization procedure on the SD card comprises:
controlling pin #4 of the SD card to be substantially 3.3 volts; and
providing a clock to pin #5 of the SD card.

10. The method of claim 8, wherein the step of determining whether the SD card is the legacy SD card further comprises:
sending a plurality of commands to the SD card; and
determining whether an expected response is received;
wherein the SD card is determined to be the legacy SD card when the expected response is received.

11. A method of identifying a type of a Secure Digital (SD) card whose pin numbers comply with an SD card specification formulated by the Secure Digital Association, the method comprising:
performing a legacy SD card initialization procedure on the SD card; and
determining in sequence whether the SD card is an SD Express card, an Ultra High Speed type II (UHS-II) SD card, or a legacy SD card after the legacy SD card initialization procedure.

12. The method of claim 11, wherein the step of determining whether the SD card is the SD Express card comprises:
sending an SD CMD0 command to the SD card; and
sending an SD CMD8 command to the SD card.

13. The method of claim 12, wherein the step of determining whether the SD card is the UHS-II SD card comprises:
sending an SD ACMD41 command to the SD card; and
determining whether a response from the SD card indicates that the SD card is the UHS-II SD card.

14. The method of claim 13, wherein the step of determining whether the SD card is the legacy SD card comprises:
determining whether a CMD8 command or a CMD41 command is received from the SD card.

15. A method of identifying a type of a Secure Digital (SD) card whose pin numbers comply with an SD card specification formulated by the Secure Digital Association, the method comprising:
performing an Ultra High Speed type II (UHS-II) SD card initialization procedure on the SD card before determining whether the SD card is a UHS-II SD card;
controlling pin #4 of the SD card to be substantially zero volts, controlling pin #14 of the SD card to be substantially zero volts, and performing a legacy SD card initialization procedure on the SD card when the SD card is not the UHS-II SD card;
determining whether the SD card is an SD Express card; and
determining whether the SD card is a legacy SD card when the SD card is not the SD Express card.

16. The method of claim 15, wherein the step of determining whether the SD card is the SD Express card comprises:
sending a CMD8 command to the SD card.

17. The method of claim 15, wherein the step of performing the UHS-II SD card initialization procedure on the SD card comprises:
controlling pin #4 of the SD card to be substantially 3.3 volts; and
controlling pin #14 of the SD card to be substantially 1.8 volts.

18. The method of claim 15, wherein the step of performing the legacy SD card initialization procedure on the SD card comprises:
controlling pin #4 of the SD card to be substantially 3.3 volts; and
providing a clock to pin #5 of the SD card.

19. The method of claim 15, wherein the step of determining whether the SD card is the UHS-II SD card comprises:
providing a first clock to pin #7 of the SD card;
providing a second clock to pin #8 of the SD card; and
providing a signal STB.L to pin #11 and pin #12 of the SD card.

20. The method of claim 15, wherein the step of determining whether the SD card is the SD Express card comprises:
sending an SD CMD0 command to the SD card; and
sending an SD CMD8 command to the SD card.

* * * * *